United States Patent [19]

Mackie

[11] Patent Number: 4,558,673
[45] Date of Patent: Dec. 17, 1985

[54] ELECTRONIC IGNITION SYSTEM FOR INTERNAL COMBUSTION ENGINES

[75] Inventor: Ronald D. Mackie, Pensacola, Fla.

[73] Assignee: Nutek, Incorporated, Pensacola, Fla.

[21] Appl. No.: 475,680

[22] PCT Filed: Jul. 2, 1982

[86] PCT No.: PCT/US82/00900
§ 371 Date: Mar. 4, 1983
§ 102(e) Date: Mar. 4, 1983

[87] PCT Pub. No.: WO83/00192
PCT Pub. Date: Jan. 20, 1983

Related U.S. Application Data

[63] Continuation-in-part of Ser. No. 280,033, Jul. 2, 1981, abandoned.

[51] Int. Cl.⁴ ............................................... F02P 5/15
[52] U.S. Cl. .................................... 123/416; 123/417; 123/424; 123/335; 123/643; 364/431.04; 364/431.10
[58] Field of Search ............... 123/416, 417, 418, 424, 123/335, 643; 364/431.03, 431.04, 431.10

[56] References Cited

U.S. PATENT DOCUMENTS

| | | | |
|---|---|---|---|
| 3,906,207 | 9/1975 | Rivere et al. | 123/416 |
| 4,099,495 | 7/1978 | Kiencke et al. | 123/416 |
| 4,119,069 | 10/1978 | Perrin | 123/416 |
| 4,177,516 | 12/1979 | Mason | 123/358 |
| 4,207,846 | 6/1980 | Borst et al. | 123/416 |
| 4,262,643 | 4/1981 | Cavil et al. | 123/416 |
| 4,265,211 | 5/1981 | Meloeny | 123/416 |
| 4,267,810 | 5/1981 | Wesemeyer et al. | 123/416 |
| 4,355,360 | 10/1982 | Asano et al. | 364/431.11 |
| 4,359,987 | 11/1982 | Wesemeyer et al. | 123/417 |

FOREIGN PATENT DOCUMENTS

| | | | |
|---|---|---|---|
| 0026429 | 4/1981 | European Pat. Off. | 123/643 |
| 2708114 | 8/1978 | Fed. Rep. of Germany | 123/335 |
| 55-96364 | 7/1980 | Japan | 123/643 |
| 1460288 | 12/1976 | United Kingdom . | |
| 1497539 | 1/1978 | United Kingdom . | |
| 1520943 | 8/1978 | United Kingdom . | |
| 2022701 | 12/1979 | United Kingdom . | |
| 1563151 | 3/1980 | United Kingdom . | |
| 1600792 | 10/1981 | United Kingdom . | |

OTHER PUBLICATIONS

Radio Shack New 1975-1976 unabridged Dictionary of Electronics, edited by Rudolf F. Graf—1975.

*Primary Examiner*—Andrew M. Dolinar
*Attorney, Agent, or Firm*—Beveridge, De Grandi & Weilacher

[57] ABSTRACT

An electronic ignition system for an internal combustion engine. In a first embodiment an input pulse is generated at the same point in each revolution of the engine. Clock pulses at a first pulse rate are counted between consecutive input pulses. The resulting count signal is transferred to a down counter which, between the consecutive input pulses, counts down at a faster rate. For an eight cylinder engine this faster rate is four times the first pulse rate, for a six cylinder engine it is three times the first pulse rate, and for a four cylinder engine it is twice the first pulse rate. In a second embodiment a computed count signal is reset into a down counter which is then counted down. In each embodiment, when the down counter reaches its zero count level the count signal is again preset into it so that it recycles. Each time the down counter passes a pre-selected count level, an output pulse is generated. Four output lines are provided for use with an eight cylinder engine, three for a six cylinder engine, and two for a four cylinder engine. The output pulses are applied to each output line in turn. Thus, during each engine revolution each output line receives a pulse, and during two engine revolutions each cylinder of the engine receives a pulse. In the event of operation at excessively high speed, only one out of a pre-selected number of pulses is applied and the pulses are sequenced among the output lines to prevent fouling of sparkplugs while inhibiting the excessively high speed operation.

18 Claims, 6 Drawing Figures

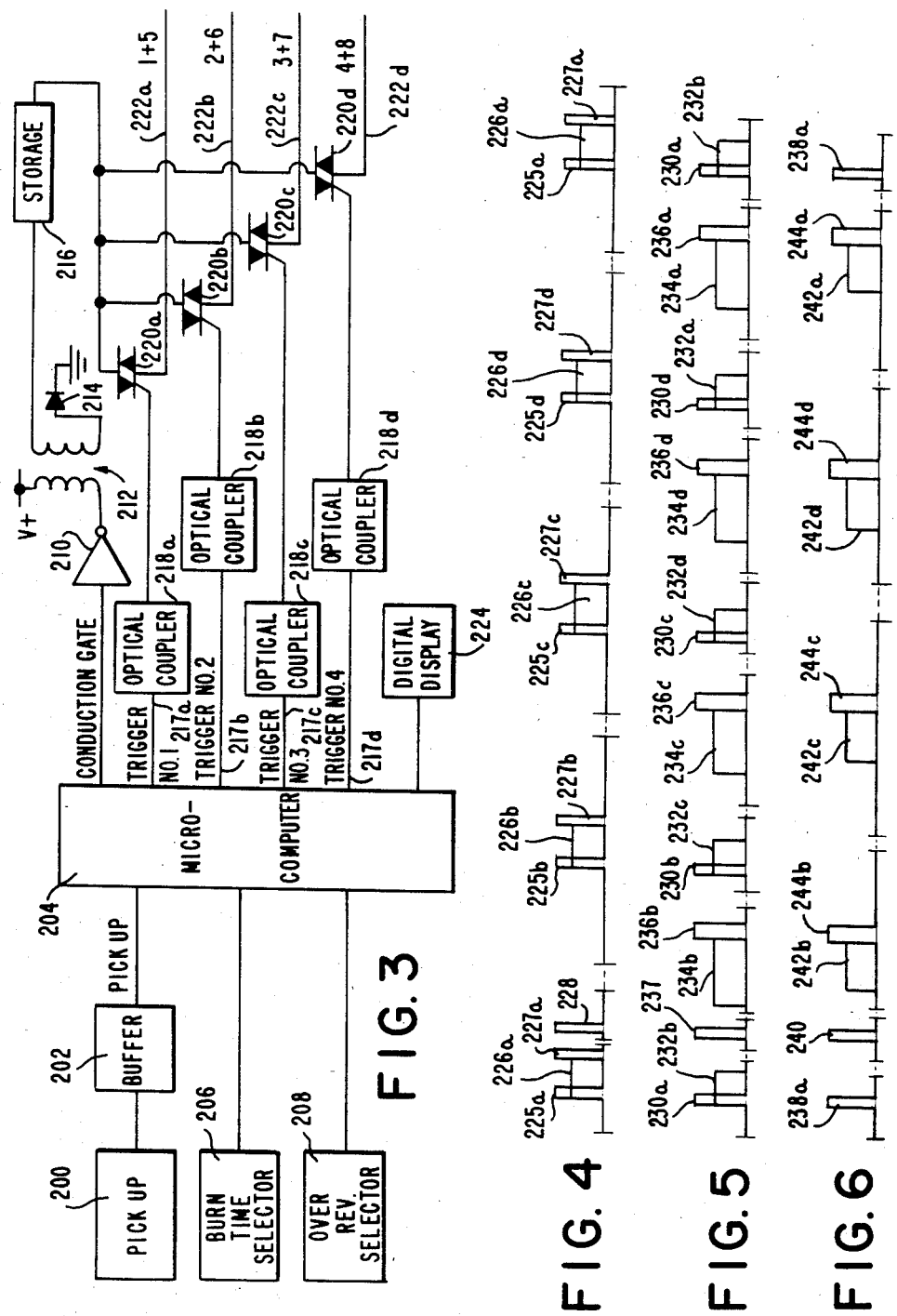

ELECTRONIC IGNITION SYSTEM FOR INTERNAL COMBUSTION ENGINES

CROSS-REFERENCE TO RELATED APPLICATION

This application is a continuation-in-part of U.S. patent application Ser. No. 280,033 filed July 2, 1981 now abandoned.

BACKGROUND OF THE INVENTION

The present invention pertains to an internal combustion engine ignition control system. More particularly, the present invention pertains to an electronic ignition control system for generating a spark to ignite the fuel within a cylinder of an internal combustion engine at the optimum time to assure maximum fuel efficiency and engine performance.

The operating performances of an internal combustion engine is dependent, at least in part, on the point during the cycle of operation of each cylinder at which the fuel is ignited. The time of ignition affects the fuel efficiency, the amount of power generated by the engine, and the smoothness of engine operation. Mechanical means for controlling the ignition time are available, but generally these are cumbersome devices of questionable accuracy, often involving weights and springs to control the operating time of various components, and such mechanical components are inherently inaccurate and subject to operating fluctuations.

SUMMARY OF THE INVENTION

The present invention is an electronic ignition timing control device for controlling the initiation of a spark within a cylinder of an internal combustion engine so that the spark occurs at the optimum time for ignition of the fuel within that cylinder, to achieve optimum engine performance. In accordance with the present invention, the engine performance during each timing interval of the engine is used to determined the ignition timing during a subsequent timing interval. Generally, the burning time for a given fuel/air mixture at a particular compression ratio is relatively independent of the engine speed. Accordingly, in accordance with a first embodiment of the present invention, at the same point during each revolution of the engine, an electrical pulse is generated by a magnetic pickup in cooperation with a rotating component within the engine such as the crank shaft, and this pickup pulse is used to initiate operation of a counter which then counts clock pulses of a fixed frequency until the next pickup pulse, when the rotating component next passes the same point. A number, representing the number of clock pulses counted between consecutive pickup pulses, is then preset into a second counter which is then counted down by a second set of clock pulses occurring at a higher rate than the first clock pulses. When this down counter reaches a preselected count, an output pulse is generated to cause an electrical pulse to be applied to a selected sparkplug to initiate combustion within the associated cylinder. The interval between pickup pulses is inversely related to the engine speed. By controlling the value of the preselected count of the second counter, the time available for burning of the air/fuel mixture before the piston reaches its initial mechanical timing (normally before the top dead center position) is maintained at the optimum value for the desired engine performance.

In another embodiment of the present invention a predetermined count level is present into a down counter which is then counted down at a rate which during normal engine running operation results in generation of the output pulses at the desired time. The down count level at the time of receipt of the pickup pulse is divided in half, and the resulting number is subtracted from the present count level. This new count level is then preset into the down counter for a subsequent timing interval.

In each embodiment, then, the engine speed during each timing interval of the engine is utilized in determining the spark initiation times during a subsequent timining interval.

Preferably, the down counter operation is utilized to provide a spark-initiating pulse for each of the cylinders of the engine. Thus, for example, in an eight cylinder engine, the count pulses for the down counter are at a rate which produces four output pulses during each engine revolution. As a consequence, during two revolutions of the engine, eight spark-initiating pulses are generated, one for each cylinder.

While suitable for use with any internal combustion engine, the ignition control system of the present invention is particularly suited for use with high performance engines, for example engines of racing cars.

BRIEF DESCRIPTION OF THE DRAWINGS

These and other aspects and advantages of the present invention are more apparent in the following detailed description and claims, particularly when considered in conjunction with the accompanying drawings. In the drawings:

FIG. 3 is a block diagram of a further embodiment of an ignition control system in accordance with the present invention; and Each of FIGS. 4 through 6 is a timing diagram useful in explaining the operation of the embodiment of FIG. 3.

DETAILED DESCRIPTION OF THE INVENTION

Figure 1:
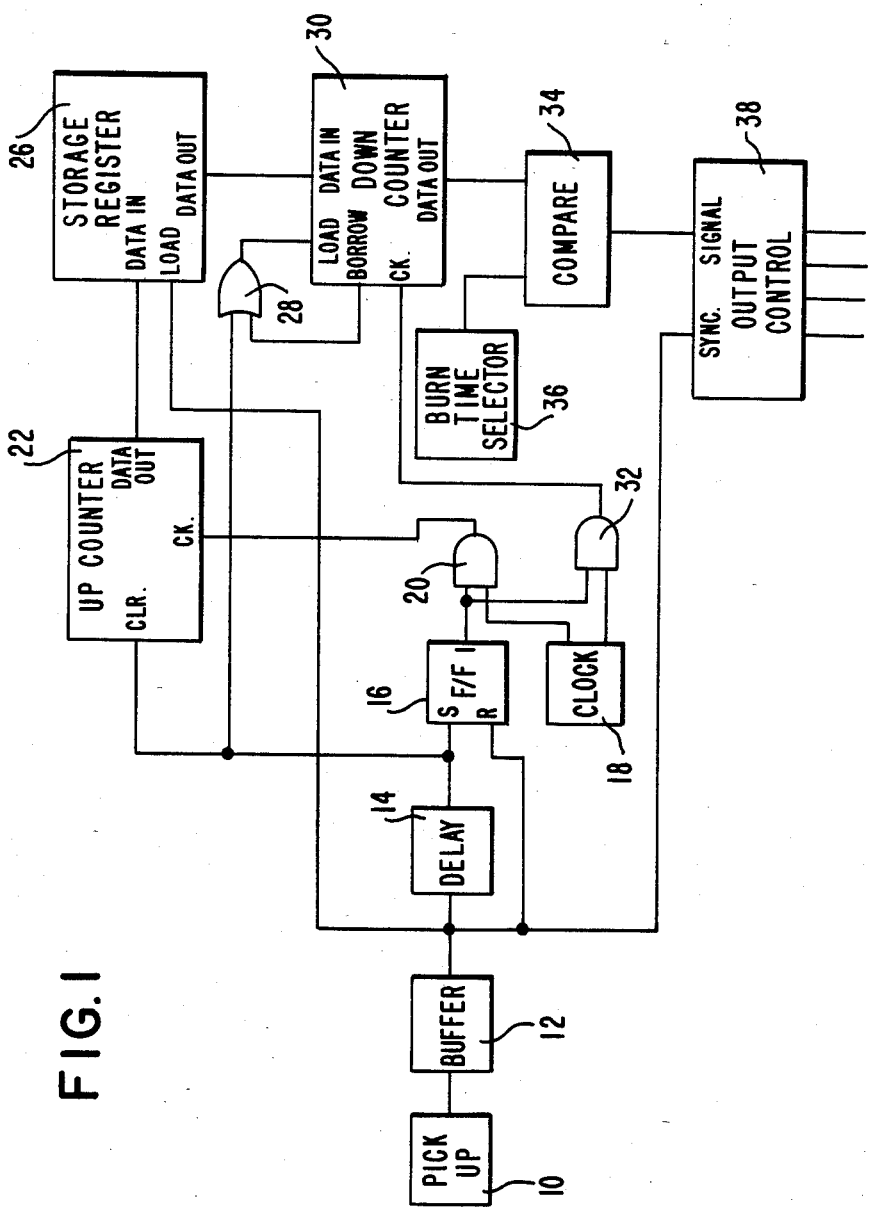
FIG. 1 is a logical block diagram of a first embodiment of an ignition control system in accordance with the present invention.

In accordance with the embodiment of the present invention depicted in FIG. 1, the output of magnetic pickup device 10 is applied through buffer amplifier 12 to delay circuit 14 which, by way of example, might be a monostable multivibrator. The output of a delay circuit 14 is applied to the set input of bistable multivibrator or flip-flop 16, the reset input of which is connected to the output of buffer amplifier 12.

Clock 18 provides a first output to one input of AND gate 20, the other input of which receives the ONE output from flip-flop 16. The output of gate 20 is connected to the count or clock input of up counter 22 which has its clear input connected to the output of delay circuit 14. The data outputs of counter 22 are connected to the data inputs of storage register 26, the load input of which is connected to the output of buffer amplifier 12. The data outputs of storage register 26 are connected to the data inputs of down counter 30. The output of delay circuit 14 is connected to one input of OR gate 28, the second input of which is connected to the borrow output of down counter 30. The output of OR gate 28 is connected to the load input of down counter 30. Accordingly, when pickup 10 applies a pulse through buffer 12, the count then in up counter 22 passes to storage register 26, and after delay circuit 14 has timed out, the value stored in register 26 is applied to down counter 30 to preset that counter and up counter 22 is cleared to zero.

A second output from clock 18 is applied to one input of AND gate 32, the second input of which is connected to the ONE output of flip-flop 16. The output of AND gate 32 is connected to the count or clock input of down counter 30. The data outputs from down counter 30 are connected to one set of inputs of compare circuit 34, which receives a second set of inputs from burn time selector circuit 36. Burn time selector circuit 36 can be one or more switches positioned to permit the driver or operator of the engine to designate the desired burn time in accordance with the desired engine performance, as affected by such factors as air density, temperature, humidity, and fuel type. When the count from down counter 30 indicates that this selected burn time has been reached, compare circuit 34 applies a pulse to the signal input of output control circuit 38. Counter 30 continues to count down until its borrow output applies a pulse through OR gate 28 to its load input, causing the count value stored in register 26 to again be present into down counter 30 which continues to count down in response to pulses from clock 18 and AND gate 32.

In response to the signal from compare circuit 34, output control circuit 38 applies an output pulse on an enabled one of its four output lines and sequences to enable the next one of its output lines. The output of buffer 12 is connected to the synchronization input of output control 38 to assure that the output control is synchronized at each revolution of the engine.

Clock 18 applies pulses of a first frequency through AND gate 20 to the count input of up counter 22. By way of example, if the circuit of FIG. 1 is to be utilized with an eight cylinder engine, then pulses at a frequency of 31,250 pulses per second, and thus a pulse interval of 32 microseconds, might be utilize. Similarly, for a six cylinder engine, pulses of a frequency of 41,667 pulses per second, and thus a plane intrval of 24 microseconds, might be utilized, and for a four cylinder engine, pulses of a frequency of 62,500 pulses second, and thus a pulse interval of 16 microseconds, might by utilized.

Clock 18 provides pulses of a higher frequency through gate 32 to the count input of down counter 30. By way of example, these pulses might have a frequency in the order of 125,000 pulses per second and thus a pulse interval of 8 microseconds. Thus, for an eight cylinder engine, these down count pulses are at a frequency four times as great as the frequency of the up count pulses. Similarly, for a six cylinder enging, the down pulses are at a frequency three times as great as the frequency of the up count pulses and for a four cylinder engine the down count pulses are at twice the frequency of the up count pulses. Additionally, output control circuit 38 has four output lines when used with an eight cylinder engine, three output lines when used with a six cylinder engine, and two output lins when used with a four cylinder engine. Thus, output control 38 provides an output pulse on each of its output lines once during each engine revolution whether used with an eight cylinder engine, a six cylinder engine, or a four cylinder engine. Each of the output lines from output control 38 is coupled through an ignition amplifier to a double-ended spark coil to initiate a spark in each of the associated cylinders. Thus, for example in an eight cylinder engine, thd first output line initiates sparks in the first and fifth cylinders in firing sequence. One of these cylinders will have fuel, and so combustion will be initiated. The other cylinder will have no fuel, and so the spark will have no effect.

In operation, after a pulse from pickup 10 has been received and delay circuit 14 has timed out and set flip-flop 16, up counter 22 counts pulses from clock 18. When the next pulse is received from pickup 10, buffer 12 resets flip-flop 16, and so up counter 22 stops counting, and its count signal is loaded into storage register 26. When delay circuit 14 has timed out, up counter 22 is cleared, the stored count signal in register 26 is loaded into down counter 30, and clock 28 again applied clock pulses to up counter 22, and higher frequency clock pulses to down counter 30. Down counter 30 counts down from the stored count signal until it reaches the count signal indicated by burn time selector 36. Compare circuit 34 then applies a pulse to output control 38 which, in turn, applies the pulse to the enabled one of its output lines and sequences to enable the next output line. Counteddr 30 continues to count down until it reaches its zero count level, at which time a pulse from its borrow output passes through OR gate 28 to again load the count signal in storage register into the down counter. The sequence continues, with an output pulse being generated on the newly enabled output line, output control 38 sequencing to enable the next output line, and donw counter 30 counting to its zero level and again reloading the stored count signal. Since the clock pulses applied to down counter 30 are at a rate four times the rate of the clock pulses applied to up counter 22 in a system used with an eight cylinder engine, output cotrol 38 provides an output pulse on each of its four lines during each revolution of the engine. Thus, during every two engine revolutions, each of the eight cylinders receives a spark. Pickup 10 provides a new input pulse during each revolution to initiate the next cycle of operation with a count signal indicative of the engine speed during the most recent engine revolution.

For a six cylinder engine the clock pulses applied to down counter 30 are at a rate three times as great as the rate of the clock pulses applied to up counter 22, and output control 38 has three output lines. Thus, again, output control 38 provides a pulse on each of its output lines during each revolution of the engine. Similarly, for a four cylinder engine the down counter clock pulses are at twice the rate of the up counter pulses and output control 38 has two output lines, with an output pulse being provided on each during each revolution of the engine.

As the engine speed increases, the consecutive pulses from pickup 10 becomes closer together, and so a lower count signal is transferred from up counter 22 to storage register 26 and subsequently transferred from the storage register to down counter 30. Nevertheless, since the spark is initiated at the count level indicated by burn time selector 36, and since that count level represents the time before the next pickup pulse is expected, the burn time remains substantially constant, thus assuring optimum engine performance. Burn time selector 36 permits adjustment of this available burn time to provide optimum engine performance. The engine speed during each revolution of the engine, as represented by the level to which up counter 22 has counted, is transferred to down counter 30 to be used in determining the spark initiation times during the immediately following engine revolution.

Figure 2:
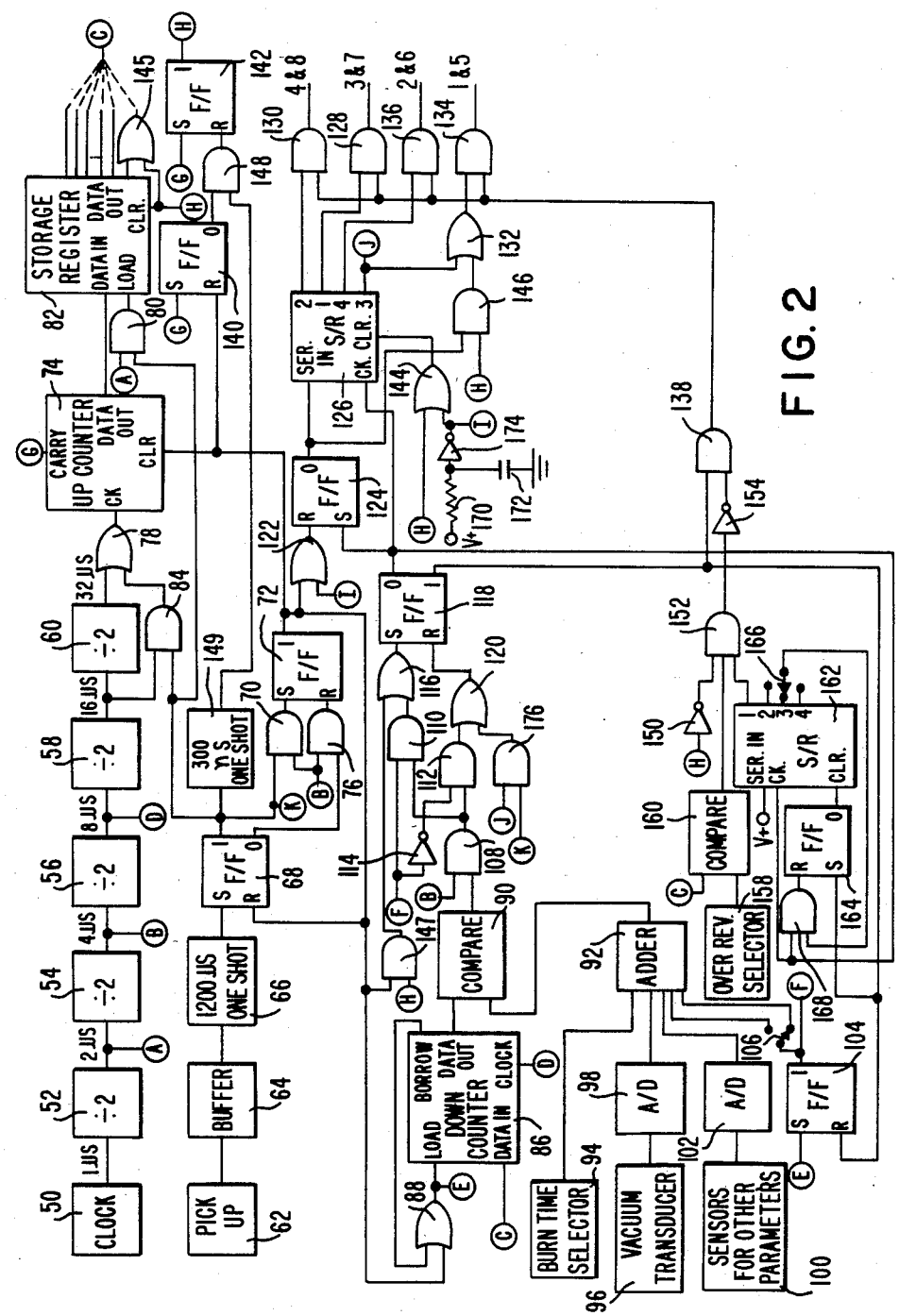
FIG. 2 is a logical block diagram of another embodiment of an ignition control system in accordance with the present invention.

FIG. 2 depicts in a more detailed logical block diagram form a second embodiment of an electronic ignition timing control system in accordance with the present invention. For clarity of illustration in FIG. 2 the interconnections of a number of lines are shown by a lettered connector, in the form of a circle attached to the line with a letter within the circle. Thus, for example, in FIG. 2 the output of the divider circuit 52 is connected to a connector A which is depicted as the letter A within a circle. That connector A connects to every other connector A in FIG. 2, for example the connector A attached to one input of AND gate 80. In like manner, each of the other lettered connectors in FIG. 2 is connected to every other like-lettered connector in the figure. Additionally, unless otherwise stated, for ease of illustration in FIG. 2 positive logic is utilized in which the presence of a signal is represented by a positive voltage level. In implementing the circuitry of FIG. 2, negative logic may be preferred for circuit optimization, and this is readily within the skill in the art.

In the system of FIG. 2 clock 50 provides a basic one megahertz clock signal which is applied through a chain of divide-by-two counters or dividers 52, 54, 56, 58, and 60, making available clock pulses at frequencies of 500 kilohertz, 250 kHz, 125 kHz, 62.5 kHz, and 31.25 kHz. These clock pulses from dividers 52-60 thus occur at intervals of two microseconds, four us., eight us., 16 us., and 32 us.

Each revolution of the internal combustion engine, pickup device 62 provides an output pulse through buffer amplifier 64 to the input of monostable multivibrator or one-shot 66 which, in response to such pulse, provides a voltage pulse of 1200 microseconds duration. The output from one-shot 66 is applied to the set input of flip-flop 68, and so flip-flop 68 is set, while the 1200 us. output from one-shot 66 blocks noise from the flip-flop. The ONE output of flip-flop 68 is connected to one input of AND gate 70, the second input of which is connected to the output of divider 54 to receive the four us. clock pulses. The output of gate 70 is connected to the set input of flip-flop 72. Accordingly, the first four us. Clock pulse following receipt of a pulse from pickup 62 results in flip-flop 72 being set. The ONE output from flip-flop 72 is connected to the reset input of flip-flop 68 to terminate the flip-flop 68 ONE output applied to gate 70 so that flip-flop 72 receives only one pulse at its set input for each pickup pulse.

The ONE output from flip-flop 72 is also applied to the clear input of up counter 74 to reset the counter to its zero count. When flip-flop 68 returns to its reset condition, its ZERO output is applied to one input of AND gate 76, the second input of which receives the four us. clock pulses from divider 54. The output of AND gate 76 is connected to the reset input of flip-flop 72. Accordingly, at the first four us. clock pulse after flip-flop 68 is reset, AND gate 76 applies a signal to the reset input of flip-flop 72 to return that flip-flop to its reset condition. Counter 74 then counts 32 us. clock pulses which are applied from divider 60 through OR gate 78 to the count or clock input of counter 74.

The ONE output from flip-flop 68 is applied to one input of AND gate 80, the second input of which receives the two us. clock pulses from divider 52. Therefore, at the next two us. clock pulse after pickup 62 generates its next pulse, causing flip-flop 68 to again be set, gate 80 applies a signal to the load input of storage register 82, causing the storage register to store the count level then in up counter 74. This count level represents the number of 32 us. clock pulses received from divider 60 between consecutive input pulses and so is indicative of the speed of the internal combustion engine. If more than one half of the 32 us. interval of divider 60 has elapsed at the time the pickup pulse causes flip-flop 68 to be set, divider 58 is applying a signal to one input of AND gate 84, the second input of which receives the ONE output from flip-flop 68. As a consequence, gate 84 applies a signal through OR gate 78 to the clock input of up counter 74, thus rounding the count up to the next count level.

The data out outputs from storage register 82 are coupled to the data in inputs of down counter 86. The ONE ouput of flip-flop 72 is applied through OR gate 88 to the load input of down counter 86. As a consequence when flip-flop 72 is set, the count value stored in storage register 84 is loaded into down counter 86 to preset the down counter.

The eight us. pulses from divider 56 are applied to the count or clock input of down counter 86 so that the down counter counts down from its preset level with each pulse from divider 56. Accordingly, down counter 86 is counting down at a rate four times as great as the rate at which up counter 74 is counting.

The count signals in down counter 86 are applied by the counter data out outputs to one set of inputs to compare circuit 90. The second set of inputs of compare circuit 90 receives signals from adder 92. As inputs adder 92 receives signals indicative of various parameters making up the desired burn time for the fuel within the cylinders of the internal combustion engine. Thus, the first input to adder 92 is from burn time selector 94 which can be a switch or a set of switches available to the driver or the operator of the internal combustion engine to permit that person to set a desired burn time based on his observation of engine performance. Similarly, vacuum transducer 96 applies a signal through analog-to-digital converter 98 to adder 92 so that the burn time can be adjusted in accordance with the engine vacuum during acceleration and deceleration. In like manner, various other parameters that might affect the burn time are applied from associated sensors, represented by sensors 100 coupled to analog-to-digital converter 102, to adder 92. Further, the output of OR gate 88 is connected to the set input of flip-flop 104, the ONE output of which is tied to the moving contact of single-pole-single-throw switch 106. Switch 106 has its two fixed contacts connected to two separate weighted inputs of adder 92 so that the value applied to adder 92 by the ONE output of flip-flop 104 is dependent upon the position of switch 106.

When the count signal in down counter 86 is less than the signal applied to compare circuit 90 by adder 92 the compare circuit applies a signal to one input of AND gate 108, the second input of which receives the four us. clock pulses from divider 54. Gate 108 has its output tied to one input of AND gate 110 and to one input of AND gate 112. The ONE output from flip-flop 104 is connected to the second input of AND gate 110 and is coupled by inverter 114 to the second input of AND gate 112. The output of AND gate 110 is coupled through OR gate 116 to the set input of flip-flop 118, while the output of AND gate 112 is coupled through OR gate 120 to the reset input of flip-flop 118. The ONE output of flip-flop 118 is connected to the reset input of flip-flop 104. As a consequence, while flip-flop 104 is set to add to the value applied by adder 92 to compare circuit 90, down counter 86 counts down until the counter signal reaches a value less than that applied by adder 92. This causes an output from compare circuit 90 to AND gate 108. On the next four us. clock pulse from divider 54, AND gate 108 applies a signal through AND gate 110 and OR gate 116 to set flip-flop 118. The ONE output from flip-flop 118 resets flip-flop 104, terminating the signal applied by flip-flop 104 through switch 106 to adder 92. Therefore, the value applied by adder 92 to compare circuit 90 is again less than the down count signal applied from counter 86. Consequently, the output from compare circuit 90 terminates. When the count signal from down counter 86 again becomes less than the signal from adder 92, compare circuit 90 generates a second output. On the next four us. clock pulse from divider 54, gate 108 again generates an output. However, since flip-flop 104 is reset, AND gate 110 is blocked, while AND gate 112 is enabled to pass the pulse from gate 108 through OR gate 120 to reset flip-flop 118.

The ONE output from flip-flop 72 passes through OR gate 122 to the reset input of flip-flop 124. The ZERO output of flip-flop 118 is connected to the set input of flip-flop 124. Thus, when detection of the pickup pulse causes flip-flop 72 to be set, flip-flop 124 is reset, and when the second compare signal from compare circuit 90 causes flip-flop 118 to be reset, flip-flop 124 is set.

When flip-flop 124 is reset, it applies a signal to the serial-in input of shift register 126. The ZERO output of flip-flop 118 is tied to the clock input of shift register 126, and so when flip-flop 118 is reset while flip-flop 124 is reset, a pulse is clocked into the first stage of shift register 126. Shift register 126 is a four bit shift register and has its number 1 output connected to one input of AND gate 128, its number 2 output connected to one input of AND gate 130, its number 3 output connected to one input of OR gate 132 the output of which is connected to one input of AND gate 134, and its number 4 output connected to one input of AND gate 136. Each AND gate 128, 130, 134, and 136 has its second input tied to the output of AND gate 138, one input of which is connected to the ONE output of flip-flop 118.

AND gate 134 has its output coupled through an ignition amplifier to a double-ended spark coil for the first and fifth cylinders in the firing sequence of the engine. Similarly, AND gate 136 has its output coupled through an ignition amplifier to a double-ended spark coil for the second and sixth cylinders in the firing sequence, AND gate 128 has its output coupled through an ignition amplifier to a double-ended spark coil for the third and seventh cylinders in thd firing sequence, and AND gate 130 has its output coupled through an ignition amplifier to a double-ended spark coil for the fourth and eighth cylinders in the firing sequence.

In operation at normal engine speeds, up counter 74 will have counted a number of the 32 us. clock pulses from divider 60 during the interval between consecutive pulses from pickup 62. At the time the next pulse from pickup 62 causes flip-flop 68 to be set, if a 16 us. clock pulse is available from dividers 58, AND gate 84 applies a pulse through OR gate 78 to up counter 74 to round the count level up to the next whole number. At the next two us. clock pulse from divider 52, AND gate 80 applies a pulse to the load input of storage register 82, causing the count signal in up counter 74 to be stored in register 82. Then, at the next four us. clock pulse divider 54, AND gate 70 applies a pulse to set flip-flop 72. The ONE ouput from flip-flop 72 clears up counter 74 for the next cycle of operation and passes through OR gate 88 to set flip-flop 104 and to load the count signal in storage register 82 into down counter 86, presetting the down counter to that count level. Each eight us. clock pulse from divider 56 causes counter 86 to count down. The count signals from counter 86 are applied to one set of inputs of compare circuit 90. When those count signals become less than the signal applied to compare circuit 90 by adder 92, the compare circuit applies a signal to AND gate 108. At the next four us. clock pulse from divider 54, AND gate 108 applies a signal to AND gate 110, which is enabled by the ONE output of flip-flop 104. As a consequence a pulse passes through OR gate 116 to set flip-flop 118. The ONE output from flip-flop 118 resets flip-flop 104, causing adder 92 to apply a lower count signal to compare circuit 90. In addition, the ONE output of flip-flop 118 passes through AND gate 138, which is enabled during this normal operating sequence, to apply a signal to one input of each of AND gates 128, 130, 134, and 136. At this time the fourth output of shift register 126 is enabling AND gate 136, and so that gate applies a pulse to its output line to cause a spark in the second and sixth cylinders in firing sequence.

Down counter 86 continuous to count eight us. clock pulses from divider 56 until it reaches the new level being applied by adder 92. Compare circuit 90 then applies another signal to AND gate 108. At the next four us. clock pulse from divider 54, AND gate 108 applies an output which passes through AND gate 112 and OR gate 120 to reset flip-flop 118. This terminates the signal from AND gate 138 and removes the signal from the reset input to flip-flop 104. The ZERO output of flip-flop 118 clocks shift register 126 to store a new signal in its first stage and sets flip-flop 124.

Down counter 86 continues to count down with each eight us. clock pulse from divider 56. When the counter reaches its ZERO count level, a pulse from its borrow output passes through OR gate 88 to its load input, causing the count signal in storage register 82 to again be loaded into the down counter. The pulse from OR gate 88 also returns flip-flop 104 to its set condition so that the ONE output of flip-flop 104 applies a signal through switch 106 to adder 92. Down counter 86 continues to count down, and when the count signal in down counter 86 reaches the level of the signal from adder 92, compare circuit 90 applies a signal through gates 108, 110, and 116 to again set flip-flop 118. The ONE output from flip-flop 118 again resets flip-flop 104, reducing the level of the count signal from adder 92, and applies a signal from AND gate 138 to each AND gate 128, 130, 134, and 136. Since AND gate 128 is receiving a signal from shift register 126 at that time, a pulse is generated on its output line of the third and seventh cylinders in firing sequence. When the count signal from down counter 86 reaches the lower signal now being applied by adder 92 to compare circuit 90, the compare circuit applies another signal through gates 108, 112, and 120 to reset flip-flop 118, terminating the output signal. The ZERO output from flip-flop 118 clocks shift registers 126 to its next output.

Down counter 86 continues to count, and its borrow output causes the sequence to continue again, providing another pulse from AND gate 138 to each AND gate 128, 130, 135, and 136, and so generating an output pulse for the fourth and eighth cylinders in firing order. Once again the cycle repeats, generating a spark for the first and fifth cylinders in firing order. Because the pulses applied to the clock input of down counter 86 are at four times the frequency of the pulses applied to the clock input of up counter 74, down counter 86 goes through about four cycles of operation between each pulse from pickup 62. When the next pulse is received from pickup 62, flip-flop 68 is again set, and the new count signal in up counter 74 is applied to storage register 82, and the whole cycle starts again. During the next revolution of the engine this new count signal is utilized to determine the timing of the four spark pulses from AND gates 128, 130, 134, and 136.

During operation at low engine speeds, for example on startup of the engine, engine operation is acceptable that is less optimum than during normal running, particularly since these intervals are generally comparatively brief. During this operation the consecutive pulses from pickup 62 are at such long intevals that up counter 74 overflows. This overflow condition results in a pulse from the carry output of up counter 74 which sets flip-flops 140 and 142. The ONE output of flip-flop 142 is applied to one input of OR gate 144, the output of which is connected to the clear input of shift register 126. As a consequence, during this startup condition shift register 126 is retained in its cleared condition, and so no pulses are available from shift register 126 to enable AND gates 128, 130, 134, and 136 to provide output pulses.

The ONE output from flip-flop 142 is applied to the clear input of storage register 82 to clear the storage register to a zero count signal. Storage register 82 stores the count signal in binary form and thus might provide, for example, twelve output lines to down counter 86. While most of these output lines go directly from storage register 82 to down counter 86, one line, for example the line representing binary 512, is connected to an input of OR gate 145, the output of which is connected to the appropriate data in input of down counter 86. The second input of OR gate 145 is connected to the ONE output of flip-flop 142. Consequently, when flip-flop 142 is set during startup operation, storage register 82 is cleared to a zero count signal, and a binary 512 signal is applied to down counter 86 so that, using the eight us. clock pulses from divider 56, 4096 us. are required to count down zero. Of course, adder 92 is generally set to cause an output from compare circuit 90 before that zero level is reached.

The ONE output of flip-flop 142 is also applied to an input of AND gate 146, the second input of which receives the ZERO output from flip-flop 124. The output of gate 146 is coupled by OR gate 132 to the first input of AND gate 134. Thus during startup operation when a pulse is received from pickup 62 and then flip-flop 72 is set to reset flip-flop 124, AND gate 146 causes a pulse from OR gate 132 to AND gate 134.

The ONE output of flip-flop 142 is also applied to an input of AND gate 147. The second input of AND gate 147 is connected to the ONE output of flip-flop 72, and so at the next pulse from pickup 62 during this startup condition, the setting of flip-flop 72 results in AND gate 147 applying a signal through OR gate 116 to set flip-flop 118. The ONE output of flip-flop 142 is connected to the input of inverter 150, the output of which is tied to one input of AND gate 152. As a consequence, AND gate 152 applies a low signal to inverter 154, the output of which enables AND gate 138. The ONE output of flip-flop 118 thus passes through AND gate 138 to each AND gate 128, 130, 134, and 136. Since AND gate 134 is then receiving a signal from OR gate 132 and AND gate 146, a pulse is generated for the first and fifth cylinders in firing order. When down counter 86 has counted down from the signal loaded into it by flip-flop 142 to the signal from adder 92, compare circuit 90 applies a signal through gates 108, 112, and 120 to reset flip-flop 118. The ZERO output from flip-flop 118 sets flip-flop 124, and so AND gate 146 is disabled and no more output pulses can be generated during that revolution of the engine.

The ONE output from flip-flop 72 resets flip-flop 140, the ZERO output of which is applied to an input of AND gate 148. The ONE output of flip-flop 68 is applied to the input of one-shot 149, which generates a negative-going output pulse in the order of 300 nanoseconds. This output from one-shot 149 is applied to the second input of AND gate 148; however, so long as the carry output from up counter 74 indicates the startup condition, AND gate 148 is not activated because the 300 nanosecond pulse ends before flip-flop 72 is set. Once the startup condition ends, flip-flop 140 remains reset, and so the next pulse from one-shot 149 resets flip-flop 142 to place the system in normal operating condition. Testing may show that this startup condition should continue until a higher engine rpm is reached. This can be accomplished by increasing clock rates.

During operation at high engine speeds, for example while accelerating, it is desirable to inhibit operation so that the engine does not "overrev" or go so fast as to blow up or otherwise damage itself. Overrev selector 158 applies to compare circuit 160 a count signal indicative of an undesirabe high speed operation. Since the higher speed operation is indicated by a lower number being applied from up counter 74 to storage circuit 82, this overrev condition is a count signal that is lower than during normal operation. Overrev selector 158 can be one or more switches for applying this number in digital form to compare circuit 160.

The output of storage register 82 is applied to the second input of compare circuit 160. Thus, if the engine speed becomes so high that the count signal applied from up counter 74 to storage register 82 is less than the signal from overrev selector 158, compare circuit 160 applies a signal to one input of AND gate 152. The ZERO output from flip-flop 118 is applied to the clock input of shift egister. 162 and to one input of AND gate 168, the output of which is connected to the reset input of flip-flop 164. Shift register 162 has its serial-in input tied to the positive voltage source and its clear input tied to the ZERO output of flip-flop 164. Shift register 162 is a four bit shift register. The first output from shift register 162 is connected to the third input of AND gate 153. The second, third, and fourth outputs from shift register 162 are connected to respective fixed contacts of switch 166, the moving contact of which is tied to an input of AND gate 168. The set input of flip-flop 164 is connected to the ONE output of flip-flop 118.

In the overrev condition, flip-flop 142 is reset, and so inverter 150 applies a signal to AND gate 152. Each time compare circuit 90 causes flip-flop 118 to be set, flip-flop 164 is set, and each time compare circuit 90 causes flip-flop 118 to be reset, shift register 162 is clocked. When shift register 162 has just been cleared, so that none of its outputs is providing a signal, AND gate 152 provides no signal to inverter 154, and so the inverter applies a signal to one input of AND gate 138. When flip-flop 118 is next set, a pulse from AND gate 138 is applied to AND gates 128, 130, 134, and 136. The AND gate 128, 130, 134, or 136 which is then being enabled by a signal from shift register 126 provides an output pulse to the associated spark plugs. The ONE output of flip-flop 118 also sets flip-flop 164, to remove the clear input from shift register 162. When flip-flop 118 is next reset, shift register 162 is clocked to load a bit into its first stage. The ONE output from shift register 162 is applied to AND gate 152, and that AND gate applies a signal to inverter 154. This blocks AND gate 138 so that the ONE output from flip-flop 118 no longer can affect the output AND gates 128, 130, 134, and 136. Each time compare circuit 90 causes flip-flop 118 to be set and then reset, shift register 162 is again clocked. Because the serial-in input of shift register 162 is tied to the positive voltage source, each time the shift register is clocked a bit is loaded into its first stage, maintaining AND gate 138 disabled. When the output from shift register 162 reaches the output terminal to which the moving contact of switch 166 is coupled, AND gate 168 is enabled. The next time flip-flop 118 is reset, flip-flop 164 is reset to clear shift register 162. Consequently, the number of times flip-flop 118 is set and then reset during each cycle of operation of shift register 162 is dependent upn the position of switch 166.

In an eight cylinder engine, switch 166 is preferably set to the third output from shift register 162. As a consequence, an output pulse is generated for only every third cylinder in firing sequence. In such case output pulses are applied in sequence to output lines number 1, number 4, number 3, and number 2 on four consecutive revolutions of the engine, and this cycle continues so long as the overrev condition exists. This results in only one out of every three cylinder being ignited but each cylinder is ignited in turn, preventing fouling of the sparkplugs, while reducing the engine power during the overrev condition.

When power is first applied to the system, the power passes through resistor 170 to one side of capacitor 172, the other side of which is tied to ground. The junction of resistor 170 and capacitor 172 is tied to the input of inverter 174, the output of which is connected to one input of OR gate 144 and to one input of OR gate 122. As a consequence, when the power is turned on, inverter 174 causes shift register 126 to be cleared and flip-flop 124 to be reset, providing the start-up conditions for the circuitry.

Because the ONE output of flip-flop 142 causes a low count signal to be applied through OR gate 145 to compare circuit 160 during low speed operation, the flip-flop 142 ONE output is also applied through inverter 150 to AND gate 152 to disable the overrev output during that low speed operation, thereby preventing simultaneous overrev and low speed operation.

During low speed operation shift register 126 is held in a cleared condition while output pulses from AND gate 134 are generated by way of AND gate 146 and OR gate 132. These output pulses initiate sparks in the first and fifth cylinders. When the low speed operation ends and normal operation commences, shift register 126 no longer receives a clear input. The next pulse from pickup 62 causes flip-flop 72 to be set, resetting flip-flop 124 to apply a signal to the serial-in input of shift register 126. Down counter 86 then causes flip-flop 118 to be set. This is the time at which an output should be generated for the second and sixth cylinders in firing sequence, but shift registers 126 is not providing any enabling output. Down counter 86 next causes flip-flop 118 to be reset, and a signal is clocked into the first stage of shift register 126. This signal will provide the next output pulse from the system, and this output pulse will occur at the time the third and seventh cylinders are to receive sparks. Consequently, the first output from shift register 126 is connected to AND gate 128 to provide the spark for the third and seventh cylinders. Likewise, the shift register outputs two, three, and four are connected to AND gates 130, 134, and 136 respectively to provide the sparks for the fourth and eighth, the first and fifth, and the second and sixth cylinders, respectively.

If sudden acceleration occurs, the interval between consecutive pickup pulses may become so short that down counter 86 has not fully cycled. This could result in flip-flop 72 being set before flip-flop 118 clocks shift register 126 to provide an output on the fourth shift register stage. Thus, the third output of shift register 126 is connected to one input of AND gate 176, the second input of which is connected to the ONE output of flip-flop 68. The output of AND gate 176 is connected to the input of OR gate 120. Consequently, if a pickup pulse causes flip-flop 68 to be set while shift register 126 is providing an output from its third stage, AND gate 126 passes a signal through OR gate 120 to reset flip-flop 118, terminating any output pulse then present and clocking shift register 126 to its fourth stage. Similarly, if during very rapid acceleration a pickup pulse occurs before flip-flop 118 is set, appropriate gating can be provided to apply a clock pulse to shift register 126 to assure proper operation.

Again, the engine speed during each revolution of the engine, as represented by the level to which up counter 74 has counted, is applied to down counter 86 for use in determining the spark initiation times during the immediately following revolution of the engine.

Sensors 100 might include any of numerous types to accommodate any of numerous parameters affecting engine operation. By way of example, circuitry could be provided to store the up counter 74 count signal for each engine revolution, subtract that from the count signal for the next revolution to obtain an indication of acceleration or deceleration, and then subtract that difference signal from the most recent count signal to predict the count signal for the subsequent engine revolution and apply a signal based on that prediction to storage register 82. Similarly, sensors 100 could include circuitry to determine the engine speed and to provide to adder 92 a burn time adjustment based on the gear which the vehicle transmission is in.

While the inherent delays and the switching speeds of the various components are such that, with TTL logic, the circuit of FIG. 2 can be implemented, if found necessary minor delays can be added to assure proper circuit operation and to optimize that operation.

The embodiments of FIGS. 1 and 2 count clock pulses of a first frequency during each revolution of the engine and load the count signal reached during a revolution into the down counter for use during the next engine revolution. FIG. 3 depicts a preferred embodiment of an electronic ignition timing control device in accordance with the present invention in which, rather than counting pulses during one revolution of the engine and resetting the down counter to the count level reached for use during the next revolution, a computed count signal is preset into the down counter during normal running operation of the engine. In this embodiment of the present invention a microcomputer is utilized in place of numerous of the components utilized in the embodiments of FIGS. 1 and 2. As seen in FIG. 3, pickup device 200 is coupled by buffer 202 to microcomputer 204 to provide pick up pulses thereto. Buffer 202 might be a one-shot multivibrator. Burn time selector 206 and overrev selector 208 are also connected to microcomputer 204.

Microcomputer 204 applies a conduction gate signal through inverter 210 to one end of the primary of transformer 212, the second end of which is connected to a positive voltage source, for example a source of 12 volts D.C. One end of the secondary of transformer 212 is coupled to voltage storage unit 216 which might be a 1 uf, 600 volt oil filled capacitor. The second end of the transformer secondary is coupled to ground through diode 214. Transformer 212, diode 214 and storage until 216 are a simplified representation of an energy storage system more fully described in U.S. Pat. No. 4,046,125, the disclosure of which is incorporated herein by reference. Each conduction gate signal, then, results in storage of a voltage in unit 216.

For an eight cylinder engine microcomputer 204 applies four trigger pulses on four output lines 217a, 217b, 217c, and 217d which are coupled by optical couplers 218a, 218b, 218c, and 218d to the gates of triacs 220a, 220b, 220c, and 220d, respectively. The triacs 220a, 220b, 220c, and 220d have their first anodes tied respectively to output lines 222a, 222b, 222c, and 222d which are respectively coupled to the double ended spark coils for the first and fifth, the second and sixth, the third and seventh, and the fourth and eighth cylinders in the firing sequence of the engine. The second anode of each triac 220a, 220b, 220c, and 220d is connected to voltage storage unit 216, and so when microcomputer 204 generates a trigger pulse, the voltage from storage unit 216 passes through the associated triac to the associated output line to cause a spark in the associated cylinders.

In an electronic ignition control circuit in accordance with FIG. 3 for use on an eight cylinder engine, pickup device 200 receives five pulses during each revolution of the engine. Four of these are pick up pulses which occur at 90° intervals during the engine revolution and are utilized to initiate the four trigger pulses during the revolution. The fifth is an identification pulse which occurs about 30° of the engine revolution after the first pickup pulse and serves to identify that first pickup pulse.

When the engine is first started, microcomputer 204 causes the system to commence operation in a start up mode, the timing of which, at engine speeds between 50 and 900 R.P.M., is depicted in FIG. 4. Below an engine speed of 50 R.P.M. no trigger pulses are generated. Once an engine speed of 50 R.P.M. is reached and the trigger pulse sequence is identified by the identification pulse, the start up routine commences. During such operation, the number 1 pick up pulse 225a causes microcomputer 204 to initiate a conduction gate signal 226a having a duration in the order of 1400 us. At the end of the conduction gate signal, the microcomputer initiates the trigger no. 1 pulse 227a on line 217a. Likewise, the number 2, number 3 and number 4 pick up pulses 225b, 225c and 225d initiate conduction gate signals 226b, 226c and 226d for the trigger no. 2, trigger no. 3 and trigger no. 4 signals 227b, 227c and 227d on lines 217b, 217c and 217d, respectively. The identification pulse 228 identifies the number 1 pick up pulse and so assures proper sequencing. This start up routine continues until microcomputer 204 determines that the pick up pulses are at intervals indicating an engine speed above about 900 R.P.M., at which point the microcomputer transfers the system to a normal run routine.

In the start up routine, microcomputer 204 inhibits trigger pulses when the engine speed is below about 50 R.P.M. or above about 900 R.P.M. Thus, on initial turn on of the engine, no sparks are initiated until the engine speed is above 50 R.P.M., and in the event the driver or other operator inadvertently shuts off the ignition and restarts it when the engine speed is above 900 R.P.M., no trigger pulses are generated, and within about two revolutions of the engine the system has identified the trigger pulse sequence and transferred to the normal run routine.

FIG. 5 is a timing diagram illustrating normal running operation of the present invention at engine speeds below 3600 R.P.M. For an eight cylinder engine, there are four timing intervals during each revolution of the engine. During each timing interval a pick up pulse initiates a computation routine during which microcomputer 204 computes the times at which the conduction gate signal and the trigger pulse for the next timing interval should occur. Thus, in FIG. 5, upon receipt of the number 1 pickup pulse 230a, the number 2 timing interval computation routine is initiated and continues during time period 232b. In this computation routine microcomputer 204 determines the point at which conduction gate signal 234c of the third timing interval is to be initiated and the point at which that conduction gate signal should end and the number 3 trigger pulse 236c should occur on output line 217c. To determine these times, microcomputer 204 refers to a utility rountine to determine the time before the number 3 pickup pulse 230c at which ignition should occur in the third or seventh cylinder. Likewise, the number 2 pick up pulse 230b initiates the third timing interval computation routine during time period 232c during which the times of initiation of the number 4 conduction gate signal 234d and trigger pulse 236d are determined, the number 3 pick up pulse 230c initiates the fourth timing interval computation routine 232d for computation of the initiation times of the number 1 conduction gate signal 234a and trigger pulse 236a, and the number 4 pick up pulse 230d initiates the first timing interval computation routine 232a for computation of the intiation times of the number 2 conduction gate signal 234b and trigger pulse 236b. Again, the identification pulse 237 identifies the number 1 pick up pulse to assure proper sequencing.

During the first engine revolution of the normal running routine, a down counter within microcomputer 204 is loaded with a preset count level. During each computation routine, the count level in the down counter at the time of the most recent pick up pulse is divided by two and the resulting value is subtracted from or added to the previous present count level. The resulting count level is then preset into the down counter for the next timing interval. This operation continues whenever the engine is below a speed of 3600 R.P.M.

When the engine speed is above 3600 R.P.M., microcomputer 204 ignores all of the pickup pulses except for the number 1 pick up pulse of each engine revolution. The down counter counts down four times during each engine revolution, and upon receipt of the next number 1 pickup pulse, the value in the down counter is divided by two and substracted from or added to the previous preset value of the down counter. The resulting value is then preset into the down counter for use during the next revolution of the engine. Thus, each engine revolution comprises a timing interval.

FIG. 6 is a timing diagram illustrating operation at engine speeds above 3600 R.P.M. The number 1 pick up pulse 238a is identified by the identification pulse 240. The number 2 conduction gate signal 242b precedes the number 2 trigger pulse 244b. During the number 2 conduction gate signal 242b, microprocessor 204 also goes through its computation routine during which it computes the times of the subsequent number 3 conduction gate signal 242c and trigger pulse 244c, number 4 conduction gate 242d signal and trigger pulse 244d, number 1 conduction gate signal 242a and trigger pulse 244a, and number 2 conduction gate signal 242b and trigger pulse 244b. The number 2, 3 and 4 pick up pulses are not utilized in this operation above 3600 R.P.M.

If microcomputer 204 determines from the time interval between consecutive pickup pulses that the engine speed exceeds the speed indicated by overrev selector 208, the microcomputer transfers operation to an overrev mode. In this overrev mode the microcomputer generates one trigger pulse out of every three, just as in the embodiment of FIG. 2.

During operation, then, the microcomputer 204 goes through several routines: a Start up Routine is utilized during start-up; a Normal Routine is utilized during the normal running mode; when it is necessary to determine the value which should be preset into the down counter a Computation Routine is utilized; to determine the count level at which the conduction gate signal and the trigger pulse should be generated, the Computation Routine and a Utilities Routine are used; when the down counter reaches zero, microcomputer 204 transfers to an Interrupt Routine.

So long as the engine speed is above 3600 R.P.M., microcomputer 204 also determines the speed at which the engine is operating. Once the engine speed drops below 3600 R.P.M., microcomputer 204 provides a digital display 224 (FIG. 3) an indication of the maximum engine speed reached. To determine the engine speed, once each revolution of the engine, microcomputer 204 averages two consecutive down counter levels upon receipt of two consecutive number 1 pick up pulses 238a, converts the count level to a hexadecimal number, finds this number in a lookup table and from that lookup table determines the engine speed. This calculation takes place in a Tachometer Routine.

In the Utilities Routine, microcomputer 204 utilizes the engine speed to determine from a lookup table an Operational Mode. Further lookup tables are then utilized to determine the duration of the trigger pulses, the burn time and thus the time at which the trigger pulses should be initiated.

The embodiment of the present invention depicted in FIG. 3 thus initiates the sparks within the internal combustion engine with no distributor, instead using microcomputer 204 to determine the spark initiation times. Only a single counter is required of microcomputer 204. Above 3600 R.P.M. only one pickup pulse per revolution of the engine is utilized. The operation during each timing interval is used to determine the timing for the next timing interval. If desired, a vacuum transducer or other parameters can be utilized to affect the count levels at which the conduction gate signals and trigger pulses are generated, similar to the embodiment of FIG. 2. Tests with an internal combustion engine utilizing the electronic ignition system of FIG. 3 have shown that that electronic ignition system increases the engine horsepower by two to three percent at engine speeds above 3600 R.P.M. During normal running operation below 3600 R.P.M. where the down counter level at each pick up pulse is divided by two and used to adjust the value preset into the down counter, the error of deviation from a zero count level is reduced to one-fourth the amount during each engine revolution. At speeds above 3600 R.P.M. where the adjustment is made only once every engine revolution, the error is reduced by one-half each engine revolution and the new error is on the opposite side of zero, thus hunting about a zero error level.

Indianapolis-type racing cars with light flywheels require the multiple pickup pulses each revolution of the engine in order to avoid start-up problems. Other engines could utilize a single pickup pulse each revolution of the engine at all speeds, although use of a single pickup pulse each revolution results in the engine being harder to start since it is starting on only two cylinders.

Although the present invention has been described with reference to preferred embodiment, rearrangements and alterations could be made, and still the results would be within the scope of the invention.

The electronic ignition of FIG. 3 has been implemented utilizing a Motorola MC 68705P3 8 bit EPROM microcomputer unit as microcomputer 204. A four MHz crystal was utilized to provide the clock for the microcomputer. Following are the machine language programs for this microcomputer for the several routines required for the electronic ignition, including the Start up Routine, the Normal Routine, the Computation Routine, the Interrupt Routine, the Tachometer Routine, and the Utilities Routine, as well as the RAM addresses. This microcomputer includes an 8-bit microprocessor, and each instruction of the program requires 16, or in some cases 24, bits and so uses two, or in some cases three, addresses. In the program, the pick up pulse is designated "crank trigger".

| | START UP ROUTINE | |
|---|---|---|
| INDEX ADDRESS | CONTENTS | DESCRIPTION |
| 00 | A6 | LOAD A (IMM) |
| 01 | FF | 1111/1111 |
| 02 | B7 | STORE A (DIR) |
| 03 | 02 | PORT C |
| 04 | B7 | STORE A (DIR) |
| 05 | 06 | PORT C DDR |
| 06 | B7 | STORE A (DIR) |
| 07 | 01 | PORT B |
| 08 | B7 | STORE A (DIR) |
| 09 | 05 | PORT B (DDR) |
| 0A | 3F | CLEAR (DIR) |
| 0B | 00 | PORT A (TURNS ON OVERFLOW LED) |
| 0C | AE | LOAD X (IMM) |
| 0D | C0 | 1100/0000 |
| 0E | BF | STORE X (DIR) |
| 0F | 04 | PORT A DOR (SETS UP XTAL CHECK) |
| 10 | B7 | STORE A (DIR) |
| 11 | 10 | LOAD VALVE |
| 12 | AE | LOAD X (IMM) |
| 13 | 0B | 0000/1011 (MODE 3) |
| 14 | BF | STORE X (DIR) |
| 15 | 23 | NEW TCR (MODE 3=8 MICRO SECONDS) |
| 16 | A6 | LOAD A (IMM) |
| 17 | 06 | 0000/0110 |
| 18 | B7 | STORE A (DIR) |
| 19 | 28 | HIGH START LIMIT |

| | | -continued |
|---|---|---|
| 1A | 3F | CLEAR (DIR) |
| 1B | 30 | MAX RPM |
| 1C | 3F | CLEAR (DIR) |
| 1D | 26 | 3600 RPM FLAG |
| 1E | 10 | SET BIT 0 (DIR) |
| 1F | 25 | SPARK FLAG |
| 20 | 9A | ENABLE INTERRUPTS (INH) |
| 21 | 3F | CLEAR (DIR) |
| 22 | 11 | CRANK TRIGGER FLAG |
| 23 | 5F | CLEAR X (INH) (X=0 INITIALLY) |
| 24 | 1E | SET BIT 7 (DIR) |
| 25 | 00 | PORT A |
| 26 | 3F | CLEAR (DIR) |
| 27 | 00 | PORT A |
| 28 | 1C | SET BIT 6 (DIR) |
| 29 | 01 | PORT B |
| 2A | 01 | BRANCH IF BIT 0 IS CLEAR (REL) |
| 2B | 11 | CRANK TRIGGER FLAG |
| 2C | F7 | (−9) (WAIT FOR CRANK TRIGGER) |
| 2D | 3F | CLEAR (DIR) |
| 2E | 1C | INTERRUPT COUNTER |
| 2F | 3F | CLEAR (DIR) |
| 30 | 11 | CRANK TRIGGER FLAG |
| 31 | 00 | BRANCH IF BIT 0 SET (REL) |
| 32 | 11 | CRANK TRIGGER FLAG |
| 33 | 05 | (+5) |
| 34 | 0F | BRANCH IF BIT 7 CLEAR (REL) |
| 35 | 1C | INTERRUPT COUNTER |
| 36 | FA | (−6) (WAIT FOR NEXT CRANK TRIGGER) |
| 37 | 20 | BRANCH ALWAYS (REL) |
| 38 | E8 | (−24) (RPM IS TOO SLOW) |
| 39 | B6 | LOAD A (DIR) |
| 3A | 28 | HIGH START LIMIT (MAX RPM) |
| 3B | B1 | COMPARE A (DIR) 1180 RPM |
| 3C | 1C | INTERRUPT COUNTER |
| 3D | 24 | BRANCH IF C CLEAR (REL) |
| 3E | EE | (−18) (7 INTERRUPTS INCLUDING 1 CRANK MUST OCCUR |
| 3F | 3F | CLEAR (DIR) |
| 40 | 28 | HIGH START LIMIT |
| 41 | B3 | COMPARE X (DIR) (INITIALLY X = 0) |
| 42 | 1C | INTERRUPT COUNTER |
| 43 | 24 | BRANCH IF C CLEAR (REL) |
| 44 | 05 | (+5) (BRANCH IF IDENT TRIGGER) (X INTERUPPTS) |
| 45 | BE | LOAD X (DIR) |
| 46 | 1C | INTERRUPT COUNTER |
| 47 | 54 | RIGHT SHIFT X (INH) (½) |
| 48 | 20 | BRANCH ALWAYS |
| 49 | E3 | (−29) |
| 4A | 3F | CLEAR (DIR) |
| 4B | 11 | CRANK TRIGGER FLAG |
| 4C | 3F | CLEAR (DIR) |
| 4D | 1C | INTERRUPT COUNTER |
| 4E | 01 | BRANCH IF BIT 0 CLEAR (REL) |
| 4F | 11 | CRANK TRIGGER FLAG |
| 50 | FD | (−3) (WAIT FOR CRANK TRIGGER) |
| 51 | B3 | COMPARE X (DIR) |
| 52 | 1C | INTERRUPT COUNTER |
| 53 | 24 | BRANCH IF C CLEAR (REL) |
| 54 | D8 | (−40) (INTERRUPT COUNTER MUST BE GREATER THAN X TO CONTINUE) |
| 55 | 3F | CLEAR (DIR) |
| 56 | 11 | CRANK TRIGGER FLAG |
| 57 | A6 | LOAD A (IMM) |
| 58 | 1D | 0001/1101 (180° #3 SPARK) |
| 59 | B7 | STORE A (DIR) |
| 5A | 13 | INTERVAL ENABLE |
| 5B | 44 | SHIFT RIGHT A (INH) |
| 5C | B7 | STORE A (DIR) |
| 5D | 23 | NEW TCR (MODE 6) |
| 5E | A6 | LOAD A (IMM) |
| 5F | FF | 1111/1111 |
| 60 | B7 | STORE A (DIR) |
| 61 | 10 | LOAD VALVE |
| 62 | 44 | LOGICAL SHIFT RIGHT A (INH) |
| 63 | B7 | STORE A (DIR) |
| 64 | 2A | NEW MAX POS ERROR (½ INTERVAL) |
| 65 | A6 | LOAD A (IMM) |
| 66 | E9 | 1110/1001 (MODE 6-1408 CONDUCTION) |
| 67 | B7 | STORE A (DIR) |
| 68 | 22 | NEW START TRIGGER |
| 69 | 3F | CLEAR (DIR) |
| 6A | 27 | JUMP OUT FLAG |
| 6B | 01 | BRANCH IF BIT 0 CLEAR (REL) |
| 6C | 13 | INTERVAL ENABLE |
| 6D | 28 | (+40) |
| 6E | 01 | BRANCH IF BIT 0 CLEAR (REL) |
| 6F | 11 | CRANK TRIGGER FLAG |
| 70 | FD | (−3) (WAIT FOR NEXT CRANK TRIGGER) |
| 71 | 9B | DISABLE INTERRUPTS (INH) |
| 72 | 1F | CLEAR BIT 7 (DIR) |
| 73 | 01 | PORT B (START CONDUCTION) |
| 74 | 01 | BRANCH IF BIT 0 CLEAR (REL) |
| 75 | 27 | JUMP OUT FLAG |
| 76 | 03 | (+3) |
| 77 | CD | JUMP TO SUBROUTINE (EXT) |
| 78 | 04 | TO COMPUTATIONS |
| 79 | 00 | (IF JUMP OUT FLAG SET) |
| 7A | B6 | LOAD A (DIR) |
| 7B | 16 | START TRIGGER |
| 7C | B1 | COMPARE A (DR) |
| 7D | 08 | TDR |
| 7E | 25 | BRANCH IF C SET (REL) |
| 7F | FC | (−4) (WAIT TO START TRIGGER) |
| 80 | 83 | SOFT WARE INTERRUPT (INH) |
| 81 | 3F | CLEAR (DIR) |
| 82 | 25 | SPARK FLAG |
| 83 | 3F | CLEAR (DIR) |
| 84 | 11 | CRANK TRIGGER FLAG |
| 85 | 99 | SET CARRY BIT |
| 86 | 39 | ROTATE LEFT THRU CARRY (DIR) |
| 87 | 13 | INTERVAL ENABLE |
| 88 | 9A | ENABLE INTERRUPTS (INH) |
| 89 | 08 | BRANCH IF BIT 4 SET (REL) |
| 8A | 13 | INTERVAL ENABLE |
| 8B | 11 | (+17) (BRANCH IF NOT IDENT TIME) |
| 8C | A6 | LOAD A (IMM) |
| 8D | E5 | 1110/0101 (1664=25° 2500 RPM). |
| 8E | B1 | COMPARE A (DIR) |
| 8F | 08 | TDR |
| 90 | 25 | BRANCH IF C SET (REL) |
| 91 | FC | (−4)(SHORT BLOCK FOR IDENT TRIGGER) |
| 92 | 10 | SET BIT 0 (DIR) |
| 93 | 25 | SPARK FLAG (END BLOCK) |
| 94 | 38 | LOGICAL SHIFT LEFT (DIR) |
| 95 | 13 | INTERVAL ENABLE (SET UP SPARK #2) |
| 96 | 01 | BRANCH IF BIT 0 CLEAR (REL) |
| 97 | 11 | CRANK TRIGGER FLAG |
| 98 | FD | (−3) (WAIT FOR IDENT TRIGGER) |
| 99 | 3F | CLEAR (DR) |
| 9A | 11 | CRANK TRIGGER FLAG |
| 9B | 20 | BRANCH ALWAYS |
| 9C | D1 | (−47) (GO BACK FOR TRIGGER #2) |
| 9D | 00 | BRANCH IF BIT 0 SET (REL) |
| 9E | 27 | JUMP OUT FLAG (ONLY AFTER #2 SPARK) |
| 9F | 18 | (+24) (LEAVE OVERFLOW) |
| A0 | B6 | LOAD A (DIR) |
| A1 | 1B | MAX POS ERROR |
| A2 | B1 | COMPARE A (DIR) |
| A3 | 08 | TDR |
| A4 | 25 | BRANCH IF C SET (REL) |
| A5 | FC | (−4) (BLOCK FOR 8000 MICROSECONDS) |
| A6 | 10 | SET BIT 0 (DIR) |
| A7 | 25 | SPARK FLAG (REMOVE |

-continued

| | | |
|---|---|---|
| A8 | B6 | LOAD A (DIR) BLOCK) |
| A9 | 16 | START TRIGGER |
| AA | B1 | COMPARE A (DIR) |
| AB | 08 | TDR |
| AC | 24 | BRANCH IF C CLEAR (REL) |
| AD | FC | (−4) (WAIT FOR INTERRUPT) |
| AE | 01 | BRANCH IF BIT 0 CLEAR (REL) |
| AF | 11 | CRANK TRIGGER FLAG |
| B0 | BD | (−67) |
| B1 | 02 | BRANCH IF BIT 1 SET (REL) |
| B2 | 13 | INTERVAL ENABLE |
| B3 | BA | (−70) (BRANCH IF NOT 180° #3 SPARK) |
| B4 | 10 | SET BIT 0 (DIR) |
| B5 | 27 | JUMP OUT FLAG |
| B6 | 20 | BRANCH ALWAYS |
| B7 | B6 | (−74) |
| B8 | A6 | LOAD A (IMM) |
| B9 | 22 | 0010/0010 |
| BA | B7 | STORE A (DIR) |
| BB | 17 | START CONDUCTION (2176) |
| BC | A6 | LOAD A (IMM) |
| BD | 0C | 0000/1100 |
| BE | B7 | STORE A (DIR) |
| BF | 16 | START TRIGGER (768) |
| C0 | 1C | SET BIT 6 (DIR) |
| C1 | 09 | TCR (DISABLE TIMER INTERRUPTS) |
| C2 | 1C | SET BIT 6 (DIR) |
| C3 | 00 | PORT A TURNS OFF OVERFLOW LED) |
| C4 | CC | JUMP UNCONDITIONAL (EXT) |
| C5 | 05 | TO NORMAL ROUTINES |
| C6 | 09 | ("LOAD A" IN OVERREV ROUTINE) |

NORMAL ROUTINE

| INDEX ADDRESS | CONTENTS | DESCRIPTION |
|---|---|---|
| 00 | 0C | BRANCH IF BIT 6 SET (REL) |
| 01 | 01 | PORT B |
| 02 | 0A | (+10) (BRANCH IF OVERREV LED IS OFF) |
| 03 | 20 | BRANCH ALWAYS (REL) |
| 04 | 10 | (+16) (IN OVERREV-LED IS ON) |
| 05 | 3A | DECREMENT (DIR) |
| 06 | 15 | MISS PATTERN FLAG |
| 07 | 26 | BRANCH IF Z CLEAR (REL) |
| 08 | F7 | (−9) (SEE IF IN OVERREV) |
| 09 | A6 | LOAD A (IMM) |
| 0A | 03 | 0000/0011 (2 MISSES OUT OF 3) |
| 0B | B7 | STORE A (DIR) |
| 0C | 15 | MISS PATTERN FLAG |
| 0D | B6 | LOAD A (DIR) |
| 0E | 17 | START CONDUCTION |
| 0F | B1 | COMPARE A (DIR) |
| 10 | 08 | TDR |
| 11 | 25 | BRANCH IF C SET (REL) |
| 12 | FC | (−4) (WAIT FOR START CONDUCTION) |
| 13 | 1F | CLEAR BIT 7 (DIR) |
| 14 | 01 | PORT B (START CONDUCTION) |
| 15 | 01 | BRANCH IF BIT 0 CLEAR (REL) |
| 16 | 26 | 3600 RMP FLAG |
| 17 | 06 | (+6) (DON'T COMPUTE DURING CONDUCTION GATE BELOW 3600) |
| 18 | 00 | BRANCH IF BIT 0 SET (REL) |
| 19 | 13 | INTERVAL ENABLE |
| 1A | 03 | (+3)(COMPUTE IN INTERVAL #2 ONLY WHEN ABOVE 3600 RPM) |
| 1B | CD | JUMP TO SUBROUTINE (EXT) |
| 1C | 04 | TO COMPUTATION |
| 1D | 00 | ROUTINES |
| 1E | B6 | LOAD A (DIR) |
| 1F | 16 | START TRIGGER |
| 20 | B1 | COMPARE A (DIR) |
| 21 | 08 | TDR |
| 22 | 25 | BRANCH IF C SET (REL) |
| 23 | FC | (−4) (WAIT FOR START TRIGGER) |
| 24 | 83 | SOFTWARE INTERRUPT (INH) |
| 25 | B6 | LOAD A (DIR) |
| 26 | 40 | 0100/0000 |
| 27 | B7 | STORE A (DIR) |
| 28 | 04 | PORT A DDR (REFRESH A DDR) |
| 29 | 0E | BRANCH IF BIT 7 SET (REL) |
| 2A | 00 | PORT A |
| 2B | 02 | (+2) |
| 2C | 3F | CLEAR (DIR) |
| 2D | 30 | MAX RPM (CLEAR BUTTON IS PUSHED) |
| 2E | 01 | BRANCH IF BIT 0 CLEAR (REL) |
| 2F | 26 | 3600 RPM FLAG |
| 30 | 0B | (+11) (BRANCH IF BELOW 3600 RPM) |
| 31 | B6 | LOAD A (DIR) |
| 32 | 14 | AVERAGE RPM |
| 33 | B1 | COMPARE A (DIR) |
| 34 | 30 | MAX RPM |
| 35 | 24 | BRANCH IF C CLEAR (REL) |
| 36 | 02 | (+2)(BRANCH IF MAX RPM IS HIGHER RPM) |
| 37 | B7 | STORE A (DIR) (AVERAGE RPM) |
| 38 | 30 | MAX RPM |
| 39 | 97 | TRANSFER A TO X (INH)(AVG RPM) |
| 3A | 20 | BRANCH ALWAYS |
| 3B | 02 | (+2) |
| 3C | BE | LOAD X (DIR) |
| 3D | 30 | MAX RPM (USED BELOW 3600 RPM) |
| 3E | B6 | LOAD A (DIR) |
| 3F | 1C | INTERRUPT COUNTER |
| 40 | 26 | BRANCH IF Z CLEAR (REL) |
| 41 | 3D | (+61)(CHECK DISPLAY EVERY 256 SPARKS) |
| 42 | 06 | BRANCH IF BIT 3 SET (REL) |
| 43 | 13 | INTERVAL ENABLE |
| 44 | 3A | (+58)(MAKES SURE CHECK NOT DONE DURING INTERVAL #1) |
| 45 | 3C | INCREMENT (DIR) |
| 46 | 1C | INERRUPT COUNTER |
| 47 | 20 | BRANCH ALWAYS |
| 48 | 36 | (+54) |
| 49 | A6 | LOAD A (IMM) |
| 4A | FF | 1111/1111 |
| 4B | B7 | STORE A (DIR) |
| 4C | 01 | PORT B |
| 4D | B7 | STORE A (DIR) |
| 4E | 05 | PORT B DDR (REFRESH) |
| 4F | D6 | LOAD A (INDEXED - 16 BIT) |
| 50 | 01 | REFERENCE ADDRESS |
| 51 | 00 | TACH DISPLAY VALVES |
| 52 | B1 | COMPARE A (DIR) AVG RPM ABOVE 3600 |
| 53 | 31 | DISPLAY VALUE |
| 54 | 26 | BRANCH IF Z CLEAR (REL) MAX RPM BELOW 3600 |
| 55 | 06 | (+6)(BRANCH IF DIFFERENT) |
| 56 | A6 | LOAD A (IMM) (RPM STILL THE SAME) |
| 57 | 02 | 0000/0010 |
| 58 | B7 | STORE A (DIR) |
| 59 | 32 | DISPLAY FLAG |
| 5A | 20 | BRANCH ALWAYS |
| 5B | 27 | (+39)(BRANCH IF DISPLAY STILL OK) |
| 5C | 3A | DECREMENT (DIR) |
| 5D | 32 | DISPLAY FLAG |
| 5E | 26 | BRANCH IF Z CLEAR (REL) |
| 5F | 23 | (+35) (BRANCH IF DISPLAY STILL OK) |
| 60 | B7 | STORE A (DIR) |
| 61 | 31 | DISPLAY VALUE (MAX RPM BELOW 3600 AVG RPM ABOVE 3600) |
| 62 | AE | LOAD X (IMM) |
| 63 | 02 | 0000/0010 |

4,558,673

| | | -continued |
|---|---|---|
| 64 | BF | STORE X (DIR) |
| 65 | 32 | DISPLAY FLAG |
| 66 | AA | OR TO A (IMM) |
| 67 | F0 | 1111/0000 |
| 68 | B7 | STORE A (DIR) |
| 69 | 01 | PORT B |
| 6A | 19 | CLEAR BIT 4 (DIR) |
| 6B | 01 | PORT B (START LSB LATCH PULSE) |
| 6C | B6 | LOAD A (DIR) |
| 6D | 31 | DISPLAY VALUE |
| 6E | 18 | SET BIT 4 (DIR) |
| 6F | 01 | PORT B (END LSB LATCH PULSE) |
| 70 | 99 | SET CARRY BIT (INH) |
| 71 | 46 | ROTATE RIGHT A (INH) |
| 72 | 47 | ARITHMETIC RIGHT A (INH) |
| 73 | 47 | ARITHMETIC RIGHT A (INH) |
| 74 | 47 | ARITHMETIC RIGHT A (INH) |
| 75 | B7 | STORE A (DIR) |
| 76 | 01 | PORT B |
| 77 | 1B | CLEAR BIT 5 (DIR) |
| 78 | 01 | PORT B (START MSB LATCH PULSE) |
| 79 | A6 | LOAD A (IMM) |
| 7A | FF | 1111/1111 |
| 7B | B7 | STORE A (DIR) |
| 7C | 01 | PORT B (END MSB LATCH PULSE) |
| 7D | B7 | STORE A (DIR) |
| 7E | 05 | PORT B DDR (REFRESH) |
| 7F | B6 | LOAD A (DIR) |
| 80 | 16 | START TRIGGER |
| 81 | B1 | COMPARE A (DIR) |
| 82 | 08 | TDR |
| 83 | 24 | BRANCH IF C CLEAR (REL) |
| 84 | FC | (−4)(WAIT FOR NEW TDR INTERVAL) |
| 85 | B6 | LOAD A (DIR) |
| 86 | 08 | TDR (WAIT FOR LATE TRIGGER) |
| 87 | A1 | COMPARE A (IMM) |
| 88 | 90 | 1001/0000 (BIT 4 ALLOWS FOR INSTRUCTION TIME) |
| 89 | 24 | BRANCH IF C CLEAR (REL) |
| 8A | FA | (−6)(VALID TRIGGER CAN STILL OCCUR) |
| 8B | 9B | DISABLE INTERRUPTS |
| 8C | CC | JUMP UNCONDITIONAL (EXT) |
| 8D | 06 | TO OVERFLOW |
| 8E | 00 | (NO VALID TRIGGER) |

COMPUTATION ROUTINE

| INDEX ADDRESS | CONTENTS | DESCRIPTION |
|---|---|---|
| 00 | A6 | LOAD A (IMM) |
| 01 | 40 | 0100/0000 (SETS UP MAX RM CLEAR) |
| 02 | B7 | STORE A (DIR) |
| 03 | 04 | PORT A DDR (REFRESH) |
| 04 | A6 | LOAD A (IMM) |
| 05 | FF | 1111/1111 |
| 06 | B7 | STORE A (DIR) |
| 07 | 05 | PORT B (DDR) (REFRESH) |
| 08 | B6 | LOAD A (DIR) |
| 09 | 12 | PRESENT DIFFERENCE |
| 0A | 47 | ARITHMETIC SHIFT RIGHT A (INH) |
| 0B | A9 | ADD MEMORY & CARRY TO A (IMM) |
| 0C | 00 | 0000/0000 (ROUND OFF) |
| 0D | 40 | NEGATE A (INH) |
| 0E | 2A | BRANCH IF N IS CLEAR (REL) |
| 0F | 1D | (+29) (RPM DOWN-LOAD VALUE BIGGER) |
| 10 | BB | ADD TO A (DIR) |
| 11 | 10 | LOAD VALUE (RPM UP-LOAD VALUE SMALLER) |
| 12 | 2B | BRANCH IF N SET (REL) |
| 13 | 1D | (+29)(SMALLER, BUT BIT 7 STILL SET) |
| 14 | 48 | SHIFT LEFT A (INH) |

| | | -continued |
|---|---|---|
| 15 | 3A | DECREMENT (DIR) |
| 16 | 23 | NEW TCR (SPEED UP CLOCK) |
| 17 | 20 | BRANCH ALWAYS (REL) |
| 18 | 18 | (+24) |
| 19 | 46 | ROTATE RIGHT A (INH) |
| 1A | BE | LOAD X (DIR) |
| 1B | 23 | NEW TCR |
| 1C | A3 | COMPARE X (IMM) |
| 1D | 0E | 0000/1110 (MODE 6) |
| 1E | 25 | BRANCH IF C SET (REL) |
| 1F | 09 | (+9)(NOT IN MODE 6 OR 7) |
| 20 | 1D | CLEAR BIT 6 (IR) |
| 21 | 00 | PORT A (TURN ON OVERFLOW LED) |
| 22 | 10 | SET BIT 0 (DIR) |
| 23 | 25 | SPARK FLAG |
| 24 | 9C | RESET STACK POINTER (INH) |
| 25 | 9A | CLEAR INTERRUPT MASK (INH) |
| 26 | CC | JUMP UNCONDITIONAL (EXT) |
| 27 | 06 | TO OVERFLOW |
| *28 | 5E | (RPM LOWER THAN 916 RPM) |
| 29 | 3C | INCREMENT (DIR) |
| 2A | 23 | NEW TCR (SLOW CLOCK) |
| 2B | 20 | BRANCH ALWAYS (REL) |
| 2C | 04 | (+4) |
| 2D | BB | ADD TO A (DIR) |
| 2E | 10 | LOAD VALUE (RPM DOWN - BIGGER) |
| 2F | 25 | BRANCH IF C SET (REL) |
| 30 | E8 | (−24) (SUM TOO BIG) |
| 31 | B7 | STORE A (DIR) |
| 32 | 10 | LOAD VALVE |
| 33 | B7 | STORE A (DIR) |
| 34 | 1A | OVERREV COMPARE |
| 35 | 44 | LOGICAL SHIFT RIGHT A (INH)(+45°) |
| 36 | B7 | STORE A (DIR) |
| 37 | 2B | 45° VALUE |
| 38 | 44 | LOGICAL SHIFT RIGHT A (INH) (22½°) |
| 39 | B7 | STORE A (DIR) |
| 3A | 2C | 22½° VALUE |
| 3B | 44 | LOGICAL SHIFT RIGHT A (INH) (11¼°) |
| 3C | B7 | STORE A (DIR) |
| 3D | 2D | 11¼° VALUE |
| 3E | 44 | LOGICAL SHIFT RIGHT A (INH) (5⅝°) |
| 3F | B7 | STORE A (DIR) |
| 40 | 2E | 5⅝° VALUE |
| 41 | BB | ADD TO A (DIR) |
| 42 | 2B | 45° VALUE |
| 43 | B7 | STORE A (DIR) |
| 44 | 2F | MAX CONDUCTION GATE |
| 45 | B6 | LOAD A (DIR) |
| 46 | 2C | 22½° VALUE |
| 47 | BB | ADD TO A (DIR) |
| 48 | 2D | 11¼° VALUE |
| 49 | B7 | STORE A (DIR) |
| 4A | 2A | NEW MAX POS ERROR (33¾°) |
| 4B | B6 | LOAD A (DIR) |
| *4C | 2D (OR 2C) | 11¼° (OR 22½°) VALUE |
| 4D | B7 | STORE A (DIR) |
| 4E | 1F | MAX DEGREES ADVANCE |
| 4F | B6 | LOAD A (DIR) |
| 50 | 23 | NEW TCR |
| 51 | AA | OR TO A (IMM) |
| 52 | F0 | 1111/0000 |
| 53 | 43 | COMPLEMENT A (INH) |
| 54 | 97 | TRANSFER A TO X (INH) |
| 55 | B6 | LOAD A (DIR) |
| 56 | 00 | PORT A |
| 57 | AA | OR TO A (IMM) |
| 58 | C7 | 1100/0111 (NEGATIVE MASK) |
| 59 | 47 | ARITHMETIC SHIFT RIGHT A (INH) |
| *5A | 47 (OR 9D) | 1°/CLICK (OR 2°/CLICK) |
| 5B | AB | ADD TO A (IMM) |

-continued

| | | |
|---|---|---|
| *5C | 17=1° | (1D = 2°) (11 = RETARD ONLY) |
| 5D | ED | JUMP TO SUBROUTINE (INDEXED 8 BIT) |
| 5E | 97 | (REFERENCE ADDRESS-ARITHMETIC MODE CORRECTION) |
| 5F | BB | ADD TO A (DIR) |
| 60 | 1F | MAX DEGREES ADVANCE |
| 61 | E1 | COMPARE TO A (INDEXED - 8 BIT) |
| 62 | 85 | (REFERENCE ADDRESS - MODE ADVANCE) |
| 63 | 25 | BRANCH IF C SET (REL) |
| 64 | 02 | (+2)(BRANCH IF MAX ADVANCE) |
| 65 | E6 | LOAD A (INDEXED - 8 BIT) |
| 66 | 85 | (REFERENCE ADDRESS-MODE ADVANCE) |
| 67 | B7 | STORE A (DIR) |
| 68 | 22 | NEW START TRIGGER |
| 69 | BB | ADD TO A (DIR) |
| 6A | 2F | MAX CONDUCTION GATE 50⅝° (56.25%) |
| 6B | B7 | STORE A (DIR) |
| 6C | 19 | MAX CONDUCTION START |
| 6D | B6 | LOAD A (DIR) |
| 6E | 22 | NEW START TRIGGER |
| 6F | EB | ADD TO A (INDEXED - 8 BIT) |
| 70 | 80 | (REFERENCE ADDRESS - MODE CONDUCTION) |
| 71 | 25 | BRANCH IF C SET (REL) |
| 72 | 04 | (+4) |
| 73 | B1 | COMPARE A (DIR) |
| 74 | 19 | MAX CONDUCTION START |
| 75 | 25 | BRANCH IF C SET (REL) |
| 76 | 02 | (+2) |
| 77 | B6 | LOAD A (DIR) |
| 78 | 19 | MAX CONDUCTION START |
| 79 | B7 | STORE A (DIR) |
| 7A | 29 | NEW START CONDUCTION |
| 7B | A3 | COMPARE X (IMM)(X HAS NEW TCR COMPLEMENT) |
| 7C | 03 | 0000/0011 (MODE 4 COMPLEMENT) |
| 7D | 27 | BRANCH IF Z SET (REL) |
| 7E | 04 | (+4)(MODE 4 - COULD BE IN OVERREV) |
| 7F | 25 | BRANCH IF C SET (REL) |
| 80 | 28 | (+40) UNDER 3600 - CAN'T OVERREV |
| 81 | 1F | CLEAR BIT 7 (DIR)(IN MODE 3) |
| 82 | 1A | OVERREV COMPARE |
| 83 | 01 | BRANCH IF BIT 0 CLEAR (REL) |
| 84 | 13 | INTERVAL ENABLE |
| 85 | 07 | (+7) (WOULD DO 2 COMPUTATIONS) |
| 86 | 07 | BRANCH IF BIT 3 CLEAR (REL) |
| 87 | 13 | INTERVAL ENABLE |
| 88 | 04 | (+4) (MUST BE DISBLED IF IN INTERVAL #1) |
| 89 | 1D | CLEAR BIT 6 (DIR) |
| 8A | 09 | TCR (ENABLE TIMER INTERRUPTS) |
| 8B | 10 | SET BIT 0 (DIR) |
| 8C | 26 | 3600 RPM FLAG (ABOVE 3600 RPM) |
| 8D | B6 | LOAD A (DIR) |
| 8E | 1A | OVERREV COMPARE |
| 8F | 97 | TRANSFER A TO X (INH) |
| 90 | BB | ADD TO A (DIR) |
| 91 | 33 | PREVIOUS OVERREV COMPARE |
| 92 | 46 | ROTATE RIGHT A (INH) (AVERAGE) |
| 93 | B7 | STORE A (DIR) |
| 94 | 14 | AVERAGE RPM |
| 95 | BF | STORE X (DIR) |
| 96 | 33 | PREVIOUS OVERREV COMPARE |
| 97 | A6 | LOAD A (IMM) |
| 98 | 07 | 0000/0111 (PORT A MASK) |
| 99 | B4 | AND TO A (DIR) |
| 9A | 00 | PORT A (OVERREV SWITCH) |
| 9B | 97 | TRANSFER A TO X (INH) |
| 9C | B6 | LOAD A (DIR) |
| 9D | 14 | AVERAGE RPM |
| 9E | E1 | COMPARE A (INDEXED - 8 BIT) |
| 9F | 8A | (REFERENCE ADDRESS-MODE OVERREV) |
| A0 | 25 | BRANCH IF C SET (REL) |
| A1 | 03 | (+3) (BRANCH IF IN OVERREV) |
| A2 | 1C | SET BIT 6 (DIR) |
| A3 | 01 | PORT B (TURNS OFF OVERREV LED) |
| A4 | 81 | RETURN FROM SUBROUTINE (INH) |
| A5 | 1D | CLEAR BIT 6 (DIR) |
| A6 | 01 | PORT B (TURNS ON OVERREV LED) |
| A7 | 20 | BRANCH ALWAYS |
| A8 | FB | (−5) |
| A9 | 3F | CLEAR (DIR) |
| AA | 26 | 3600 RPM FLAG (BELOW 3600) |
| AB | 1C | SET BIT 6 (DIR) |
| AC | 09 | TCR (DISABLE TIMER INTERRUPTS) |
| AD | A6 | LOAD A (IMM) |
| AE | FF | 1111/1111 |
| AF | B7 | STORE A (DIR) |
| B0 | 33 | PREVIOUS OVERREV COMPARE |
| B1 | 20 | BRANCH ALWAYS |
| B2 | EF | (−17) |

TIMING MODIFICATIONS
TO COMPUTATION ROUTINE

TO SELECT EITHER 1° OR 2° OF ADVANCE OR RETARD PER SWITCH POSITION AT 10,500 RPM CHANGE THE FOLLOWING LOCATIONS ACCORDINGLY:
(SEE *'S IN COMPUTATIONS)

| | RETARD OR ADVANCE MODEL | | RETARD ONLY MODEL | |
|---|---|---|---|---|
| LOCATION | 1° | 2° | 1° | 2° |
| 5A | 47 | 9D | 47 | 9D |
| 5C | 17 | 1D | 11 | 11 |

FOR MAXIMUM ADVANCE:

| LOCATION | 11¼° MAX ADVANCE | 22½° MAX ADVANCE |
|---|---|---|
| 4C | 2D | 2C |

| RETARD OR ADVANCE MODEL | | RETARD ONLY MODEL | |
|---|---|---|---|
| SWITCH POSITION | EFFECT | SWITCH POSITION | EFFECT |
| 0 | ADVANCE | 0 | NO CHANGE |
| 1 | ADVANCE | 1 | RETARD ONLY |
| 2 | ADVANCE | 2 | RETARD ONLY |
| 3 | NO CHANGE | 3 | RETARD ONLY |
| 4 | RETARD | 4 | RETARD ONLY |
| 5 | RETARD | 5 | RETARD ONLY |
| 6 | RETARD | 6 | RETARD ONLY |
| 7 | RETARD | 7 | RETARD ONLY |

INTERRUPT ROUTINE

| INDEX ADDRESS | CONTENTS | DESCRIPTION |
|---|---|---|
| 00 | 01 | BRANCH IF BIT 0 CLEAR (REL) |
| 01 | 26 | 3600 RPM FLAG |
| 02 | 03 | (+3) (BRANCH IF BELOW 3600) |
| 03 | 06 | BRANCH IF BIT 3 SET (REL) |
| 04 | 13 | INTERVAL ENABLE |
| 05 | 54 | (+84) (BRANCH IF TRIGGER TOO EARLY) |
| 06 | 00 | BRANCH IF BIT 0 SET (REL) |
| 07 | 11 | CRANK TRIGGER FLAG |
| 08 | 51 | (+81) (ALLOWS ONLY ONE TRIGGER) |
| 09 | 01 | BRANCH IF BIT 0 CLEAR (REL) |
| 0A | 25 | SPARK FLAG |
| 0B | 04 | (+4) (IF NO SPARK, SEE IF TOO EARLY) |
| 0C | 9D | NO OPERATION (INH) (TIME COMP) |

-continued

| | | |
|---|---|---|
| 0D | 98 | CLEAR CARRY BIT (INH) |
| 0E | 20 | BRANCH ALWAYS (REL) |
| 0F | 04 | (+4) (EQUAL TIME PATH) |
| 10 | B6 | LOAD A (DIR) |
| 11 | 1B | MAX POS ERROR |
| 12 | B1 | COMPARE TO A (DIR) |
| 13 | 08 | TDR |
| 14 | 25 | BRANCH IF C SET (REL) |
| 15 | 44 | (+68) |
| 16 | B6 | LOAD A (DIR) |
| 17 | 08 | TDR (READ ERROR) |
| 18 | B7 | STORE A (DIR) |
| 19 | 12 | PRESENT DIFFERENCE |
| 1A | 3C | INCREMENT (DIR) |
| 1B | 11 | CRANK TRIGGER FLAG |
| 1C | B6 | LOAD A (DIR) |
| 1D | 23 | NEW TCR |
| 1E | BE | LOAD X (DIR) |
| 1F | 10 | LOAD VALUE |
| 20 | B7 | STORE A (DIR) |
| 21 | 09 | TCR |
| 22 | BF | STORE X (DIR) |
| 23 | 08 | TDR |
| 24 | B6 | LOAD A (DIR) |
| 25 | 22 | NEW START TRIGGER |
| 26 | B7 | STORE A (DIR) |
| 27 | 16 | START TRIGGER |
| 28 | B6 | LOAD A (DIR) |
| 29 | 29 | NEW START CONDUCTION |
| 2A | B7 | STORE A (DIR) |
| 2B | 17 | START CONDUCTION |
| 2C | B6 | LOAD A (DIR) |
| 2D | 2A | NEW MAX POS ERROR |
| 2E | B7 | STORE A (DIR) |
| 2F | 1B | MAX POS ERROR |
| 30 | 3C | INCREMENT (DIR) |
| 31 | 1C | INTERRUPT COUNTER |
| 32 | 0D | BRANCH IF BIT 6 CLEAR (REL) |
| 33 | 00 | PORT A (IN OVERFLOW) |
| 34 | 25 | (+37) (GO BACK TO OVERFLOW) |
| 35 | 00 | BRANCH IF BIT 0 SET (REL) |
| 36 | 25 | SPARK FLAG |
| 37 | 01 | (+1) (DON'T MAKE SPARK UNLES TRIGGER EARLY) |
| 38 | 83 | SOFTWARE INTERRUPT (INH) |
| 39 | 1F | CLEAR BIT 7 (DIR) |
| 3A | 09 | TCR (CLEAR POSSIBLE TIMER INTERRUPT REQUEST) |
| 3B | 3F | CLEAR (DIR) |
| 3C | 25 | SPARK FLAG |
| 3D | 3F | CLEAR (DIR) |
| 3E | 11 | CRANK TRIGGER FLAG |
| 3F | 99 | SET CARRY BIT (INH) |
| 40 | 39 | ROTATE LEFT THROUGH CARRY (DIR) |
| 41 | 13 | INTERVAL ENABLE |
| 42 | 08 | BRANCH IF BIT 4 SET (REL) |
| 43 | 13 | INTERVAL ENABLE |
| 44 | 02 | (+2) |
| 45 | 38 | LOGICAL SHIFT LEFT (DIR) |
| 46 | 13 | INTERVAL ENABLE (SET UP #2) |
| 47 | 01 | BRANCH IF BIT 0 CLEAR (REL) |
| 48 | 26 | 3600 RPM FLAG |
| 49 | 03 | (+3) (NO TIMER INTERRUPTS BELOW 3600) |
| 4A | 06 | BRANCH IF BIT 3 SET (REL) |
| 4B | 13 | INTERVAL ENABLE |
| 4C | 02 | (+2)(NO TIMER INT. IN INTEVAL #4 ABOVE 3600) |
| 4D | 1C | SET BIT 6 (DIR) |
| 4E | 09 | TCR |
| 4F | 00 | BRANCH IF BIT 0 SET (REL) |
| 50 | 26 | 3600 RPM FLAG |
| 51 | 03 | (+3) (DON'T COMPUTE HERE ABOVE 3600 RPM) |
| 52 | CD | JUMP TO SUBROUTINE (EXT) |
| 53 | 04 | TO COMPUTATIONS |
| 54 | 00 | ---------- |
| 55 | 9C | RESET STACK POINTER (INH) |

-continued

| | | |
|---|---|---|
| 56 | 9A | CLEAR INTERRUPT MASK (INH) |
| 57 | CC | UNCONDITIONAL JUMP (EXT) |
| 58 | 05 | TO NORMAL ROUTINE |
| 59 | 05 | "DECREMENT (DIR)" |
| 5A | 80 | RETURN FROM INTERRUPT (INH) |
| 5B | 0E | BRANCH IF BIT 7 SET (REL) |
| 5C | 01 | PORT B |
| 5D | 06 | (+6) (BRANCH IF NOT IN CONDUCTION) |
| 5E | B6 | LOAD A (DIR) |
| 5F | 13 | INTERVAL ENABLE |
| 60 | B7 | STORE A (DIR) |
| 61 | 02 | PORT C (STARTS TRIGGER) |
| 62 | 1E | SET BIT 7 (DIR) |
| 63 | 01 | PORT B (ENDS CONDUCTION) |
| 64 | 10 | SET BIT 0 (DIR) |
| 65 | 25 | SPARK FLAG |
| 66 | AE | LOAD X (IMM) |
| 67 | 04 | 0000/0100 TRIGGER LENGTH |
| 68 | 5A | DECREMANT X (INH) |
| 69 | 26 | BRANCH IF Z CLEAR (REL) |
| 6A | FD | (−3) (TRIGGER TIME WAIT) |
| 6B | A6 | LOAD A (IMM) |
| 6C | FF | 1111/1111 |
| 6D | B7 | STORE A (DIR) |
| 6E | 02 | PORT C (ENDS TRIGGER) |
| 6F | B7 | STORE A (DIR) |
| 70 | 06 | PORT C DDR (REFRESH) |
| 71 | 80 | RETURN FROM INTERRUPT (INH) |
| 84 | 03 | MOR - MODE 3 (8 u SEC) (0000/0011) |
| F8 | 07 | TIMMER INTERRUPT |
| F9 | 1C | |
| FA | 07 | CRANK INTERRUPT |
| FB | 00 | |
| FC | 07 | SOFTWARE INTERRUPT |
| FD | 5B | |
| FE | 06 | OVERFLOW INTERRUPT |
| FF | 00 | |

| TACHOMETER ROUTINE | | | |
|---|---|---|---|
| INDEX ADDRESS | CONTENTS | TIME | RPM |
| 00 | FF | 1024 | 14,648 |
| 01 | FF | 1032 | 14,535 |
| 02 | FF | 1040 | 14,423 |
| 03 | FF | 1048 | 14,313 |
| 04 | FF | 1056 | 14,205 |
| 05 | FF | 1064 | 14,098 |
| 06 | FF | 1072 | 13,993 |
| 07 | FF | 1080 | 13,889 |
| 08 | FF | 1088 | 13,787 |
| 09 | FF | 1096 | 13,686 |
| 0A | FF | 1104 | 13,587 |
| 0B | FF | 1112 | 13,489 |
| 0C | FF | 1120 | 13,393 |
| 0D | FF | 1128 | 13,298 |
| 0E | FF | 1136 | 13,204 |
| 0F | FF | 1144 | 13,112 |
| 10 | FF | 1152 | 13,021 |
| 11 | 29 | 1160 | 12,931 |
| 13 | 28 | 1176 | 12,755 |
| 14 | 27 | 1184 | 12,669 |
| 15 | 26 | 1192 | 12,584 |
| 16 | 25 | 1200 | 12,500 |
| 17 | 24 | 1208 | 12,417 |
| 18 | 23 | 1216 | 12,336 |
| 19 | 23 | 1224 | 12,255 |
| 1A | 22 | 1232 | 12,175 |
| 1B | 21 | 1240 | 12,097 |
| 1C | 20 | 1248 | 12,019 |
| 1D | 19 | 1256 | 11,943 |
| 1E | 19 | 1264 | 11,867 |
| 1F | 18 | 1272 | 11,792 |
| 20 | 17 | 1280 | 11,719 |
| 21 | 16 | 1288 | 11,646 |
| 22 | 16 | 1296 | 11,574 |
| 23 | 15 | 1304 | 11,503 |

| | | | |
|---|---|---|---|
| 24 | 14 | 1312 | 11,433 |
| 25 | 14 | 1320 | 11,364 |
| 26 | 13 | 1328 | 11,295 |
| 27 | 12 | 1336 | 11,228 |
| 28 | 12 | 1344 | 11,161 |
| 29 | 11 | 1352 | 11,095 |
| 2A | 10 | 1360 | 11,029 |
| 2B | 10 | 1368 | 10,965 |
| 2C | 09 | 1376 | 10,901 |
| 2D | 08 | 1384 | 10,838 |
| 2E | 08 | 1392 | 10,776 |
| 2F | 07 | 1400 | 10,714 |
| 30 | 07 | 1408 | 10,653 |
| 31 | 06 | 1416 | 10,593 |
| 32 | 05 | 1424 | 10,534 |
| 33 | 05 | 1432 | 10,475 |
| 34 | 04 | 1440 | 10,417 |
| 35 | 04 | 1448 | 10,359 |
| 36 | 03 | 1456 | 10,302 |
| 37 | 02 | 1464 | 10,246 |
| 38 | 02 | 1472 | 10,190 |
| 39 | 01 | 1480 | 10,135 |
| 3A | 01 | 1488 | 10,081 |
| 3B | 00 | 1496 | 10,027 |
| 3C | 00 | 1504 | 9,973 |
| 3D | 99 | 1512 | 9,921 |
| 3E | 99 | 1520 | 9,868 |
| 3F | 98 | 1528 | 9,817 |
| 40 | 98 | 1536 | 9,766 |
| 41 | 97 | 1544 | 9,715 |
| 42 | 97 | 1552 | 9,665 |
| 43 | 96 | 1560 | 9,615 |
| 44 | 96 | 1568 | 9,566 |
| 45 | 95 | 1576 | 9,518 |
| 46 | 95 | 1584 | 9,470 |
| 47 | 94 | 1592 | 9,422 |
| 48 | 94 | 1600 | 9,375 |
| 49 | 93 | 1608 | 9,328 |
| 4A | 93 | 1616 | 9,282 |
| 4B | 92 | 1624 | 9,236 |
| 4C | 92 | 1632 | 9,191 |
| 4D | 91 | 1640 | 9,146 |
| 4E | 91 | 1648 | 9,102 |
| 4F | 91 | 1656 | 9,058 |
| 50 | 90 | 1664 | 9,014 |
| 51 | 90 | 1672 | 8,971 |
| 52 | 89 | 1680 | 8,929 |
| 53 | 89 | 1688 | 8,886 |
| 54 | 88 | 1696 | 8,844 |
| 55 | 88 | 1704 | 8,803 |
| 56 | 88 | 1712 | 8,762 |
| 57 | 87 | 1720 | 8,721 |
| 58 | 87 | 1728 | 8,681 |
| 59 | 86 | 1736 | 8,641 |
| 5A | 86 | 1744 | 8,601 |
| 5B | 86 | 1752 | 8,562 |
| 5C | 85 | 1760 | 8,523 |
| 5D | 85 | 1768 | 8,484 |
| 5E | 84 | 1776 | 8,446 |
| 5F | 84 | 1784 | 8,408 |
| 60 | 84 | 1792 | 8,371 |
| 61 | 83 | 1800 | 8,333 |
| 62 | 83 | 1808 | 8,296 |
| 63 | 83 | 1816 | 8,260 |
| 64 | 82 | 1824 | 8,224 |
| 65 | 82 | 1832 | 8,188 |
| 66 | 82 | 1840 | 8,152 |
| 67 | 81 | 1848 | 8,117 |
| 68 | 81 | 1856 | 8,082 |
| 69 | 80 | 1864 | 8,047 |
| 6A | 80 | 1872 | 8,013 |
| 6B | 80 | 1880 | 7,979 |
| 6C | 79 | 1888 | 7,945 |
| 6D | 79 | 1896 | 7,911 |
| 6E | 79 | 1904 | 7,878 |
| 6F | 78 | 1912 | 7,845 |
| 70 | 78 | 1920 | 7,813 |
| 71 | 78 | 1928 | 7,780 |
| 72 | 77 | 1936 | 7,748 |
| 73 | 77 | 1944 | 7,716 |
| 74 | 77 | 1952 | 7,884 |
| 75 | 77 | 1960 | 7,653 |
| 76 | 76 | 1968 | 7,622 |
| 77 | 76 | 1976 | 7,591 |
| 78 | 76 | 1984 | 7,560 |
| 79 | 75 | 1992 | 7,530 |
| 7A | 75 | 2000 | 7,500 |
| 7B | 75 | 2008 | 7,470 |
| 7C | 74 | 2016 | 7,440 |
| 7D | 74 | 2024 | 7,411 |
| 7E | 74 | 2032 | 7,382 |
| 7F | 74 | 2040 | 7,353 |
| 80 | 73 | 2048 | 7,324 |
| 81 | 73 | 2064 | 7,267 |
| 82 | 72 | 2080 | 7,212 |
| 83 | 72 | 1096 | 7,156 |
| 84 | 71 | 2112 | 7,102 |
| 85 | 71 | 2128 | 7,049 |
| 86 | 70 | 2144 | 6,996 |
| 87 | 69 | 2160 | 6,944 |
| 88 | 69 | 2176 | 6,893 |
| 89 | 68 | 2192 | 6,843 |
| 8A | 68 | 2208 | 6,793 |
| 8B | 67 | 2224 | 6,745 |
| 8C | 67 | 2240 | 6,696 |
| 8D | 67 | 2256 | 6,649 |
| 8E | 66 | 2272 | 6,602 |
| 8F | 66 | 2288 | 6,556 |
| 90 | 65 | 2304 | 6,510 |
| 91 | 65 | 2320 | 6,466 |
| 92 | 64 | 2336 | 6,421 |
| 93 | 64 | 2352 | 6,378 |
| 94 | 63 | 2368 | 6,334 |
| 95 | 63 | 2384 | 6,292 |
| 96 | 63 | 2400 | 6,250 |
| 97 | 62 | 2416 | 6,209 |
| 98 | 62 | 2432 | 6,168 |
| 99 | 61 | 2448 | 6,127 |
| 9A | 61 | 2464 | 6,088 |
| 9B | 61 | 2480 | 6,048 |
| 9C | 60 | 2496 | 6,010 |
| 9D | 60 | 2512 | 5,971 |
| 9E | 59 | 2528 | 5,934 |
| 9F | 59 | 2544 | 5,896 |
| A0 | 59 | 2560 | 5,859 |
| A1 | 58 | 2576 | 5,823 |
| A2 | 58 | 2592 | 5,787 |
| A3 | 58 | 2608 | 5,752 |
| A4 | 57 | 2624 | 5,716 |
| A5 | 57 | 2640 | 5,682 |
| A6 | 57 | 2656 | 5,648 |
| A7 | 56 | 2672 | 5,614 |
| A8 | 56 | 2688 | 5,580 |
| A9 | 56 | 2704 | 5,547 |
| AA | 55 | 2720 | 5,515 |
| AB | 55 | 2736 | 5,482 |
| AC | 55 | 2752 | 5,451 |
| AD | 54 | 2768 | 5,419 |
| AE | 54 | 2784 | 5,388 |
| AF | 54 | 2800 | 5,357 |
| B0 | 53 | 2816 | 5,327 |
| B1 | 53 | 2832 | 5,297 |
| B2 | 53 | 2848 | 5,267 |
| B3 | 52 | 2864 | 5,237 |
| B4 | 52 | 2880 | 5,208 |
| B5 | 52 | 2896 | 5,180 |
| B6 | 52 | 2912 | 5,151 |
| B7 | 51 | 2928 | 5,123 |
| B8 | 51 | 2944 | 5,095 |
| B9 | 51 | 2960 | 5,068 |
| BA | 50 | 2976 | 5,040 |
| BB | 50 | 2992 | 5,013 |
| BC | 50 | 3008 | 4,987 |
| BD | 50 | 3024 | 4,960 |
| BE | 49 | 3040 | 4,934 |
| BF | 49 | 3056 | 4,908 |
| C0 | 49 | 3072 | 4,883 |
| C1 | 49 | 3088 | 4,858 |
| C2 | 48 | 3104 | 4,832 |
| C3 | 48 | 3120 | 4,808 |
| C4 | 48 | 3136 | 4,783 |
| C5 | 48 | 3152 | 4,759 |
| C6 | 47 | 3168 | 4,735 |
| C7 | 47 | 3184 | 4,711 |

-continued

| | | | |
|---|---|---|---|
| C8 | 47 | 3200 | 4,688 |
| C9 | 47 | 3216 | 4,664 |
| CA | 46 | 3232 | 4,641 |
| CB | 46 | 3248 | 4,618 |
| CC | 46 | 3264 | 4,596 |
| CD | 46 | 3280 | 4,573 |
| CE | 46 | 3296 | 4,551 |
| CF | 45 | 3312 | 4,529 |
| D0 | 45 | 3328 | 4,507 |
| D1 | 45 | 3344 | 4,486 |
| D2 | 45 | 3360 | 4,464 |
| D3 | 44 | 3376 | 4,443 |
| D4 | 44 | 3392 | 4,422 |
| D5 | 44 | 3408 | 4,401 |
| D6 | 44 | 3424 | 4,381 |
| D7 | 44 | 3440 | 4,360 |
| D8 | 43 | 3456 | 4,340 |
| D9 | 43 | 3472 | 4,320 |
| DA | 43 | 3488 | 4,300 |
| DB | 43 | 3504 | 4,281 |
| DC | 43 | 3520 | 4,261 |
| DE | 42 | 3552 | 4,223 |
| DF | 42 | 3568 | 4,204 |
| E0 | 42 | 3584 | 4,185 |
| E1 | 42 | 3600 | 4,167 |
| E2 | 42 | 3616 | 4,148 |
| E4 | 41 | 3648 | 4,112 |
| E5 | 41 | 3664 | 4,094 |
| E6 | 41 | 3680 | 4,076 |
| E7 | 41 | 3696 | 4,058 |
| E8 | 40 | 3712 | 4,041 |
| E9 | 40 | 3728 | 4,023 |
| EA | 40 | 3744 | 4,006 |
| EB | 40 | 3760 | 3,989 |
| EC | 40 | 3776 | 3,972 |
| ED | 40 | 3792 | 3,956 |
| EE | 39 | 3808 | 3,939 |
| EF | 39 | 3824 | 3,923 |
| F0 | 39 | 3840 | 3,906 |
| F2 | 39 | 3872 | 3,874 |
| F4 | 38 | 3904 | 3,842 |
| F5 | 38 | 3920 | 3,827 |
| F6 | 38 | 3936 | 3,811 |
| F7 | 38 | 3952 | 3,796 |
| F8 | 38 | 3968 | 3,780 |
| F9 | 38 | 3984 | 3,765 |
| FA | 38 | 4000 | 3,750 |
| FB | 37 | 4016 | 3,735 |
| FC | 37 | 4032 | 3,720 |
| FD | 37 | 4048 | 3,706 |
| FE | 37 | 4064 | 3,691 |
| FF | 37 | 4080 | 3,676 |

UTILITIES ROUTINE

| ADDRESS | CONTENTS | TIME | SPARK POWER CONDUCTION MODE | RPM/RANGES |
|---|---|---|---|---|
| 80 | 0B | 1.4 milliseconds | 7 | 460–916 |
| 81 | 16 | 1.4 milliseconds | 6 | 919–1830 |
| 82 | 2C | 1.4 milliseconds | 5 | 1840–3660 |
| 83 | 40 | 1 millisecond | 4 | 3680–7320 |
| 84 | 80 | 1 millisecond | 3 | 7350–14,600 |

| | ADDRESS | CONTENTS | BURN TIME + DELAY COMP = | TOTAL | MODE | ADVANCE |
|---|---|---|---|---|---|---|
| 11¼° | 85 | 03 | 256+128= | 384 | 7 | +0.7° to +1.4° |
| | 86 | 06 | 256+128= | 384 | 6 | +1.4° to +2.8° |
| 6500 RPM | 87 | 0D | 288+128= | 416 | 5 | +3.2° to +6.3° |
| | 88 | 1A | 288+128= | 416 | 4 | +6.4° to 11¼° 6500 ABOVE 11¼° |
| | 89 | 34 | 288+128= | 416 | 3 | LIMIT |
| 22½° | 85 | 05 | 512+128= | 640 | 7 | +1.5° to +3° |
| | 86 | 0B | 576+128= | 704 | 6 | +3.2° to +6.3° |
| 6500 RPM | 87 | 16 | 576+128= | 704 | 5 | +6.4° to +12.6° |
| | 88 | 2C | 576+128= | 704 | 4 | +12.7° to +22½° |
| | 89 | 58 | 576+128= | 704 | 3 | 6500 ABOVE 22½ LIMIT. |

| ADDRESS | OVERREV | | SELECTIONS |
|---|---|---|---|
| 8A | 16 | = | 12,500 |
| 8B | 20 | = | 11,700 |
| 8C | 26 | = | 11,300 |
| 8D | 2C | = | 10,900 |
| 8E | 36 | = | 10,300 |
| 8F | 4E | = | 9,100 |
| 90 | 5A | = | 8,600 |
| 91 | 7A | = | 7,500 |

MODE CORRECTION SUBROUTINE - "LOGICAL"

| ADDRESS | CONTENTS | | MODE |
|---|---|---|---|
| 92 | 44 | LOGICAL RIGHT A (INH) | 7 |
| 93 | 44 | LOGICAL RIGHT A (INH) | 6 |
| 94 | 44 | LOGICAL RIGHT A (INH) | 5 |
| 95 | 44 | LOGICAL RIGHT A (INH) | 4 |
| 96 | 81 | RETURN FROM SUBROUTINE (INH) | 3 |
| 97 | 47 | ARITHMETIC RIGHT A (INH) | 7 |
| 98 | 47 | ARITHMETIC RIGHT A (INH) | 6 |
| 99 | 47 | ARITHMETIC RIGHT A (INH) | 5 |
| 9A | 47 | ARITHMETIC RIGHT A (INH) | 4 |
| 9B | 81 | RETURN FROM SUBROUTINE (INH) | 3 |

RAM ADDRESSES

| | |
|---|---|
| 00 | PORT A |
| 01 | PORT B |
| 02 | PORT C |
| 03 | RESERVED |
| 04 | PORT A DDR |
| 05 | PORT B DDR |
| 06 | PORT C DDR |
| 07 | RESERVED |
| 08 | TDR (TIMER DATA REGISTER) |
| 09 | TCR (TIMER CONTROL REGISTER) |
| 0A | RESERVED |
| 0B | PCR (FOR PROGRAMMING CHIP) |
| 0C | RESERVED |
| 0D | RESERVED |
| 0E | RESERVED |
| 0F | RESERVED |
| 10 | LOAD VALUE |
| 11 | CRANK TRIGGER FLAG |
| 12 | PRESENT DIFFERENCE |
| 13 | INTERVAL ENABLE |
| 14 | AVERAGE RPM |
| 15 | MISS PATTERN FLAG |
| 16 | START TRIGGER |
| 17 | START CONDUCTION |
| 18 | ODD FIRE START TRIGGER |
| 19 | MAX CONDUCTION START |
| 1A | OVERREV COMPARE |
| 1B | MAX POS ERROR |
| 1C | INTERRUPT COUNTER |
| 1D | "X" MODE VALVE |
| 1E | ODD FIRE MAX COND START |
| 1F | MAX DEGREES ADVANCE |
| 20 | UNCORRECTEO BURN TIME |
| 21 | UNCORRECTED COND START |
| 22 | NEW START TRIGGER |
| 23 | NEW TCR |
| 24 | INTERVAL #1 FLAG |
| 25 | SPARK FLAG |
| 26 | 3600 RPM FLAG |
| 27 | JUMP OUT FLAG |
| 28 | HIGH START LIMIT |
| 29 | NEW START CONDUCTION |
| 2A | NEW MAX POS ERROR |
| 2B | 45° VALUE |
| 2C | 22° VALUE |
| 2D | 11¼° VALUE |

-continued

| 2E | 5⅛° VALUE |
| 2F | MAX CONDUCTION GATE |
| 30 | MAX RPM |
| 31 | DISPLAY VALUE |
| 32 | DISLAY FLAG |
| 33 | PREVIOUS OVERREV COMPARE |

What is claimed is:

1. Apparatus for controlling the initiation of ignition sparks within the cylinders of an internal combustion engine comprising:

first means for determining the engine speed during each of n timing intervals occurring during each revolution of the engine, where n is an interger less than or equal to one-half the number of cylinders in the engine, said first means being responsive to engine speeds below a preset level for causing n to be equal to one-half the number of cylinders in the engine;

second means responsive to the engine speed during each time interval for determining the time for the initiation of the ignition sparks during the immediately subsequent timing interval; and third means for generating sparks initiating pulses at the times determined by said last-named means.

2. Apparatus as claimed in claim 1, in which said second means comprises digital data processing means.

3. Apparatus as claimed in claim 2, in which said digital data processing means comprises a microcomputer.

4. Apparatus as claimed in claim 1, in which said first means is further responsive to engine speeds above the preset level for causing n to be equal to one.

5. Apparatus for controlling the initiation of ignition sparks within the cylinders of an internal combustion engine comprising:

input means for connection to a pick up device for receiving an input signal from the pick up device at a preselected point in each revolution of the engine;

a down counter;

first means responsive to receipt of input signals by said input means for presetting said down counter to a preset count level;

a source of clock pulses connected to said down counter for counting said down counter down from said preset level;

switch means manually operable for determining a first count level, at least one transducer responsive to a condition in the engine for determining a second count level, and means for adding the first and second count levels to provide a selected count level;

a plurality of output lines adapted for coupling to sparkplugs of the cylinders of the internal combustin engine; and third means responsive to the count level of said down counter being less than the selected count level for initiating an output pulse and for applying initiated output pulses to each of said output lines in a pre-selected sequence.

6. Apparatus as claimed in claim 5, further comprising means responsive to the combination of (a) input pulses indicative of engine operation above a pre-selected speed and (b) a zero count level in said down counter, for presetting said down counter to the preset count level.

7. Apparatus as claimed in claim 5, further comprising:

fourth means responsive to input signals indicative of engine speeds above a pre-selected speed for calculating the maximum engine speed reached; and fifth means responsive to input signals indicative of engine speeds below the pre-selected speed for displaying the maximum speed calculated by said fourth means.

8. Apparatus as claimed in claim 5, further comprising:

means responsive to the receipt of input signals by said input means indicative of an undesirably high speed for generating a high speed signal;

means for generating an enabling signal each one out of a pre-selected number of times that said output pulse initiating means initiates an output pulse; and means responsive to the presence of said high speed signal during the absence of said enabling signal for inhibiting the application of output pulses to said output lines.

9. Apparatus as claimed in claim 5, in which said down counter, said source of clock pulses, said first means, said second means, and said fourth means are included within a microcomputer.

10. Apparatus for controlling the initiation of ignition sparks within the cylinders of an internal combustion engine comprising:

input means adapted for connection to a pick up device for receiving an input signal from the pick up device at a pre-selected point in each revolution of the engine;

a first source of clock pulses having a first pulse rate;

a first counter for counting the number of clock pulses from said first source occurring between receipt of consecutive input signals by said input means;

means responsive to receipt of each input signal by said input means for storing the count level to which said first counter has counted at that time;

a second counter;

means responsive to receipt of each input signal by said input means for presetting said second counter to the count level stored in said storing means in response to receipt of that input signal;

a second source of clock pulses having a second pulse rate which is an integral multiple of the first pulse rate;

means responsive to receipt of each input signal by said input means for causing said second counter to count downward at the second pulse rate from the preset count level to a zero count level;

means responsive to the zero count level of said second counter for presetting said second counter to the count level stored in said storing means;

means for selecting a count level;

a plurality of output lines equal in number to the number of said integral multiple and adapted for coupling to the sparkplugs of the cylinders of an internal combustion engine; and means responsive to the count level of said second counter being less than the selected count level for initiating an output pulse and for applying intitiated output pulses to each of said output lines in a pre-selected sequence.

11. Apparatus as claimed in claim 10, in which said means for selecting a count level comprises switch means manually operable for determining a first count level, at least one transducer responsive to a condition in the engine for determining a second count level, and means for adding the first and second count levels to provide the selected count level.

12. Apparatus as claimed in claim 5 or 11, in which said at least one transducer comprises a vacuum transducer.

13. Apparatus as claimed in claim 10, further comprising means responsive to the receipt of input signals by said input means indicative of low speed, start-up operation of the engine, for generating a start-up signal;

means responsive to the start-up signal for inhibiting the application of output pulses to the output lines in the pre-selected sequence; and means responsive to the start-up signal for initiating a single output pulse each time said input means receives an input signal from the pick up device and for applying the single output pulse to one of said output lines.

14. Apparatus as claimed in claim 13, which said means for initiating a single output pulse initiates that output pulse at an earlier point in the revolution of the engine than the corresponding output pulse would otherwise be initiated during normal operation.

15. Apparatus as claimed in claim 13, further comprising:

means responsive to the presence in said count level storing means of a count level indicative of an undesirably high speed, for generating a high speed signal;

means for generating an enabling signal each one out of a pre-selected number of times that said output pulse initiating means initiates an output pulse; and means responsive to the presence of said high speed signal during the absence of said enabling signal for inhibiting the application of output pulses to said output lines.

16. Apparatus for controlling the initiation of ignition sparks within the cylinders of an internal combustion engine comprising:

first means adapted for connection to a pickup device mounted on an internal combustion engine for receiving from the pickup device an input pulse at the onset of each of n timing intervals occurring during each revolution of the engine, where n is an integer less than or equal to one-half the number of cylinders in the engine;

second means for determining the engine speed during each of the n timing intervals;

third means for determining an expected time for receipt of the next input pulse and the deviation between that expected time and the actual time of receipt of the next input pulse;

fourth means responsive to the engine speed during each timing interval and to the deviation determined by said third means for determining the time for the initiation of the ignition spark during a subsequent timing interval;

fifth means for generating spark initiating pulses at the times determined by said fourth means; and said second, third and fourth means comprising a microcomputer including a down counter for timing the events each timing interval, means for presetting said down counter to a preset count level, and means responsive to each input pulse for dividing the value then remaining in said down counter by two and combining the result with the previous preset level to form a new preset level for presetting into said down counter for timing events in a subsequent timing interval.

17. Apparatus as claimed in claim 16, in which said first means is responsive to speeds below a preset level for causing n to be equal to one-half the number of cylinders in the engine.

18. Apparatus as claimed in claim 17, in which said first means is further responsive to engine speeds above the preset level for causing n to be equal to one.

* * * * *